US012012792B2

(12) United States Patent
Schneider et al.

(10) Patent No.: US 12,012,792 B2
(45) Date of Patent: Jun. 18, 2024

(54) HINGE FOR A FURNITURE DOOR, AND FURNITURE CARCASS HAVING SUCH A HINGE

(71) Applicant: HETTICH-ONI GMBH & CO. KG, Vlotho (DE)

(72) Inventors: Mark Schneider, Porta Westfalica (DE); Ralf Tofall, Minden (DE); Thomas Beckmann, Paderborn-Sande (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 415 days.

(21) Appl. No.: 17/598,988

(22) PCT Filed: Mar. 24, 2020

(86) PCT No.: PCT/EP2020/058233
§ 371 (c)(1),
(2) Date: Sep. 28, 2021

(87) PCT Pub. No.: WO2020/200932
PCT Pub. Date: Oct. 8, 2020

(65) Prior Publication Data

US 2022/0195768 A1 Jun. 23, 2022

(30) Foreign Application Priority Data

Mar. 29, 2019 (DE) ..................... 10 2019 108 341.9

(51) Int. Cl.

| | |
|---|---|
| ***E05D 3/14*** | (2006.01) |
| ***A47B 55/00*** | (2006.01) |
| ***E05F 3/20*** | (2006.01) |

(52) U.S. Cl.
CPC .............. *E05D 3/142* (2013.01); *A47B 55/00* (2013.01); *E05F 3/20* (2013.01); *A47B 2220/0072* (2013.01); *E05Y 2900/20* (2013.01)

(58) Field of Classification Search
CPC .... E05D 3/142; A47B 2220/0072; E05F 3/20; E05Y 2900/20
See application file for complete search history.

(56) References Cited

U.S. PATENT DOCUMENTS 6,829,808 B2 12/2004 Neukotter
11,384,577 B2 * 7/2022 Hammerer .............. E05D 3/142
(Continued)

FOREIGN PATENT DOCUMENTS

EP 1308592 A2 5/2003
IT MI20100555 A1 10/2011
(Continued)

OTHER PUBLICATIONS

Citation of Office Action dated Nov. 13, 2019 in related/corresponding DE Application No. 10 2019 108 341.9.
(Continued)

*Primary Examiner* — Daniel J Rohrhoff
(74) *Attorney, Agent, or Firm* — PATENT PORTFOLIO BUILDERS PLLC

(57) ABSTRACT

A hinge for a furniture door includes a first hinge part is formed with a cassette-shaped housing for integration into a furniture panel, and a second hinge part is designed in the form of a hinge pot to be attached to the furniture door. The two hinge parts are pivotably connected to one another via a lever mechanism. The housing of the first hinge part is widened in a front region, in which an opening for the lever mechanism is situated, in relation to a rear region. In a closed position of the hinge, at least part of the lever mechanism occupies a space in the front widened region.

20 Claims, 22 Drawing Sheets

(56) References Cited

U.S. PATENT DOCUMENTS

Figure 1A:
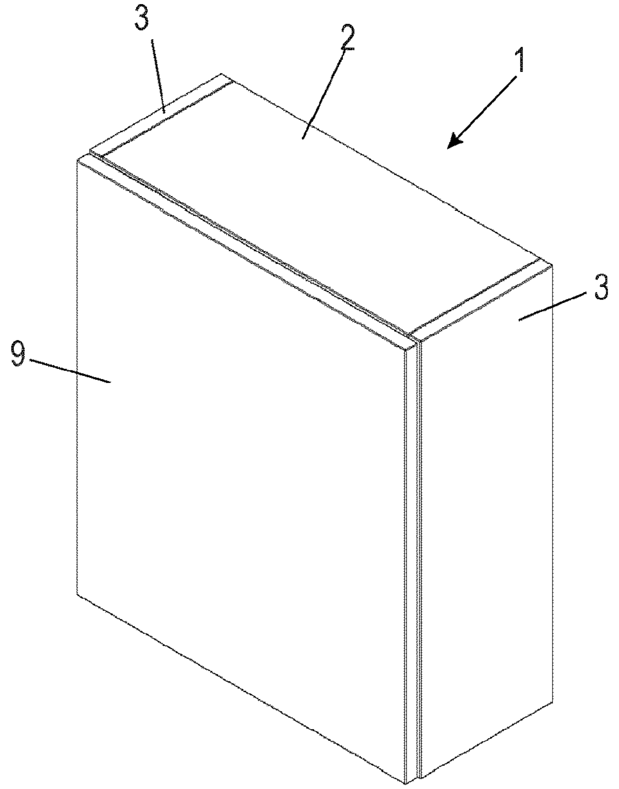

| | | | | | |
|---|---|---|---|---|---|
| 11,866,975 | B2 * | 1/2024 | Schuler | E05D 3/12 |
| 2022/0195776 | A1 * | 6/2022 | Giovannetti | E05F 3/20 |
| 2023/0349213 | A1 * | 11/2023 | Salice | E05D 5/02 |

FOREIGN PATENT DOCUMENTS

| | | | | |
|---|---|---|---|---|
| WO | 2016174071 | A1 | 11/2016 | |
| WO | 2017158139 | A1 | 9/2017 | |
| WO | WO-2020212086 | A1 * | 10/2020 | E05D 3/142 |

OTHER PUBLICATIONS

International Search Report mailed Jun. 26, 2020 in related/corresponding International Application No. PCT/EP2020/058233.
Written Opinion mailed Jun. 26, 2020 in related/corresponding International Application No. PCT/EP2020/058233.
Office Action dated Sep. 29, 2023 in related/corresponding IN Application No. 202147048780.

* cited by examiner

HINGE FOR A FURNITURE DOOR, AND FURNITURE CARCASS HAVING SUCH A HINGE

BACKGROUND AND SUMMARY OF THE INVENTION

Exemplary embodiments of the invention relate to a hinge for a furniture door, in which a first hinge part is formed having a cassette-shaped housing for integration into a furniture panel, and a second hinge part in the form of a hinge pot to be incorporated into the furniture door, wherein the two hinge parts are pivotably connected to one another via a lever mechanism and wherein at least one damper for opening and closing damping is arranged in the first hinge part. Exemplary embodiments of the invention furthermore relate to a furniture carcass in which at least one such hinge is integrated.

Hinges are used for guiding a door pivoting around a vertical axis in the furniture domain. An advantageous combination of a rotating and sliding movement of the linked furniture door may be achieved using a 7-joint hinge, which permits installation with small gap dimension in relation to adjacent and directly abutting furniture carcasses, which are also equipped with doors, flaps, or drawers, without collisions occurring during the opening of the furniture door. Hinges are frequently used in which a first hinge part is placed on a side wall of the furniture carcass and in which a second hinge part is designed as a hinge pot, which is incorporated into the inner surface of the furniture door. These hinges have the disadvantage that they obstruct a free and arbitrary design of the interior of the furniture carcass.

This disadvantage can be overcome by hinges of the type mentioned at the outset, in which the first hinge part is formed cassette-shaped and sufficiently flat that it can be inserted into a furniture panel, for example a top or bottom panel of the furniture carcass, in a corresponding recess.

Such a door hinge is known, for example, from the document WO 2016/174071 A1. The hinge has an essentially rectangular housing cassette in the top view of the plane in which the lever mechanism is located, which extends on the attachment side of the furniture door up to close to the edge of the bottom. A mechanism for opening and closing damping and a spring mechanism which holds the hinge in the closed state are arranged in the interior of the first hinge part. The hinge has the disadvantage that the first hinge part inserted into the top or bottom panel of the furniture carcass claims the front corner region of the furniture carcass for itself, so that connecting elements cannot be arranged between the top or bottom panel and a side part of the furniture carcass in the region of the hinge. Only adhesive bonding of a side panel to a narrow web of the top or bottom panel which still remains adjacent to the hinge is possible. On the one hand, the stability of the furniture carcass can thus be impaired and, on the other hand, the hinge can only be used in furniture carcasses in which a connection between top or bottom panel and side part is adapted accordingly, so that a recess in which the hinge part is inserted does not collide with connecting elements.

Accordingly, exemplary embodiments of the present invention are directed to a hinge integratable into a horizontal panel of a furniture carcass of the type mentioned at the outset, which does not restrict a use of typical connecting elements between the panel and a side wall of the furniture carcass.

A hinge according to the invention of the type mentioned at the outset is distinguished in that the housing of the first hinge part is widened in a front region, in which an opening for the lever mechanism is located, in relation to a rear region, wherein at least a part of the lever mechanism occupies a space in the front widened region in a closed position of the hinge.

In a view of the plane in which the lever mechanism is located, the housing of the first hinge part is thus formed stepped, for example. Only the region in which the housing is open toward the front and through which the lever of the lever mechanism extends between the first and the second hinge part is embodied wide and extends up to close to the edge of the furniture panel. In a region located behind this, the housing is formed narrower, so that a wider section of the furniture panel remains, which stabilizes the furniture panel in this region, on the one hand, and offers the option, on the other hand, of arranging connecting elements, e.g., dowels, screws, or eccentric connectors. The housing thus has a housing section which protrudes less deeply into the furniture panel than a remaining main section of the housing. The housing section itself has a depth of approximately 10 to 20 mm.

In a typical use of the hinge, the furniture panel is a horizontally aligned panel, for example, a top or intermediate or bottom panel of the furniture carcass. The top or intermediate or bottom panel in which the hinge is inserted can be connected to a side wall of the furniture carcass using the connecting elements. The special embodiment of the housing of the hinge thus enables the furniture carcass to be produced in conventional connection technology or the hinges according to the invention to be integrated into a furniture carcass thus produced. At least one connecting element is arrangeable in the furniture panel for connection to a further component of a furniture carcass in the installation space behind the widened region of the housing and in front of the end of the rear region of the housing.

In one advantageous embodiment of the hinge, the lever mechanism comprises an outer main lever and an inner main lever, which are rotatably linked on the housing of the first hinge part, on the one hand, and are rotatably linked on the hinge pot of the second hinge part, on the other hand. The main levers form the joint mechanism of the hinge, designed in particular as a 4-joint or 7-joint hinge.

The housing section that widens the housing laterally in the front region is preferably formed so that the inner main lever is located at least partially inside this housing section at least in a closed end position of the hinge. This is based on the finding that the housing does not have to penetrate equally deep into the furniture panel everywhere, but does not have to be formed as deep in particular in the edge region in which the main levers of the lever mechanism extend, whereby the above-mentioned free space is provided for the connecting elements. In one embodiment, the inner main lever is rotatably mounted inside the housing and in particular also inside the mentioned housing section.

In a further advantageous embodiment of the hinge, the front widened region faces in the direction of the end of the furniture door on which the hinge pot is arranged. The lever mechanism also extends at this end, which can accordingly enter at least partially into this housing section. The hinge pot can protrude beyond the front widened region in the closed state in the direction of the end of the furniture door, on which the hinge pot is arranged.

In a further advantageous embodiment of the hinge, at the front end of the housing, a contour is arranged as an insertion limit for the installation of the housing in the furniture panel.

A fastener for connecting the housing to the furniture panel can be arranged on the contour. Moreover, the contour is preferably formed circumferentially around the front housing end of the housing and overlaps a part of an end face of the furniture panel. The contour can thus be used for fastening the hinge and conceals gaps between the hinge and the furniture panel for optical and hygienic reasons.

In a further advantageous embodiment of the hinge, a damper is provided as a functional part for a closing and/or opening damping in the first and/or in the second hinge part. The damper can be a linear damper, which is designed as a tension or pressure damper or also a rotation damper. The damper preferably interacts directly or indirectly with the lever mechanism at least sometimes.

In one advantageous embodiment of the hinge, at least one of the two main levers is designed as a two-sided lever and is coupled to a damper arranged in the interior of the housing. The movement of the second hinge part is thus transmitted via the levers to the damper to implement the opening and/or closing damping. Because at least one of the main levers is designed as a two-sided lever, the movement of the lever can be transmitted into the interior of the housing, so that the damper can be arranged in the interior of the housing. The movement of the main levers is in such a way that an extreme of the path curve is present, for example, an extension of the outer main lever in a partially open position of the hinge. Both closing and also opening damping can thus be carried out using one damper. However, it is also possible to implement either only a closing or only an opening damping. The damper is preferably a linear damper, which is rotatably fastened with one side on the housing.

In a further advantageous embodiment of the hinge, the damper is linked with its other side directly on an extension of the outer main lever.

Alternatively, an indirect coupling to at least one of the two main levers is also possible. The indirect coupling can be achieved via a control curve lever, the free end of which is connected to the damper and the other end of which is rotatably connected to the housing. The control curve lever has at least one control curve, along which one end of the at least one main lever is guided. The control curve offers the option of influencing the angle dependence of the damping and thus, for example, adjusting the application points of the damping. A roller can be arranged at the end of the main lever to travel along the control curve.

Indirect coupling can also take place in that a control lever is linked on the outer main lever and on an extension of the inner main lever and is guided at one end along the control curve. A roller can also be provided here to travel along the control curve.

In a further embodiment of the hinge, for the indirect coupling to the main levers, the damper is linked with the free side on two control levers, of which one is linked with its other end on an extension of the outer main lever and the other is linked on an extension of the inner main lever.

In a further advantageous embodiment of the hinge, an elastic force accumulator, in particular a compression spring, for a holding-closed and/or holding-open function is arranged in the housing. Secure closing of the furniture door and/or secure keeping open can thus be achieved, which avoids, for example, a risk of impact on inadvertently partially open doors. Instead of a compression spring, a leaf spring or leg spring can also be used.

The force accumulator is preferably rotatably mounted with one side on the housing and is linked with its other end directly on the extension of the outer main lever. The damper and the force accumulator can be connected in one embodiment of the hinge in a common linkage point with the extension of the outer main lever.

In an alternative embodiment, it is provided that the force accumulator is linked with one side on the extension of the outer main lever and is linked with its other side on the extension of the inner main lever. In both cases, the force accumulator is compressed more strongly in a partially-open position of the hinge than in at least one of the end positions, because of which the force accumulator pre-tensions the hinge in the closed and/or in the open position. Accordingly, both a keeping-closed function for the closed position and also a keeping-open function for the open position of the hinge may be implemented using a force accumulator.

In a further advantageous embodiment of the hinge, the housing of the first hinge part has a greater housing width than housing height in an installed position. The hinge is thus ideally adapted for an installation in a horizontally aligned furniture panel, in particular a top, bottom, or intermediate panel of a furniture carcass. The housing height of the first hinge part is preferably between 9 and 15 mm, whereas the housing width of the first hinge part is between 30 and 100 mm.

A furniture carcass according to the invention is distinguished in that at least one such hinge is integrated in a panel of the furniture carcass. The advantages mentioned in conjunction with the hinges result. The panel can be a top, bottom, or intermediate panel.

BRIEF DESCRIPTION OF THE DRAWING FIGURES

Figure 1B:
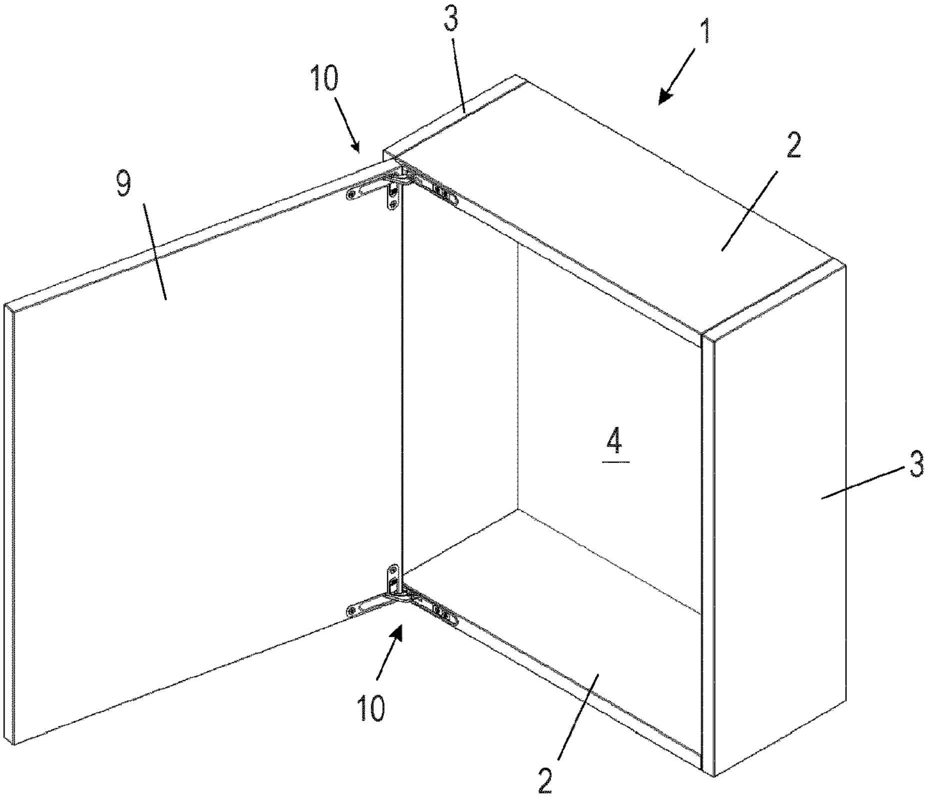
Figure 2:
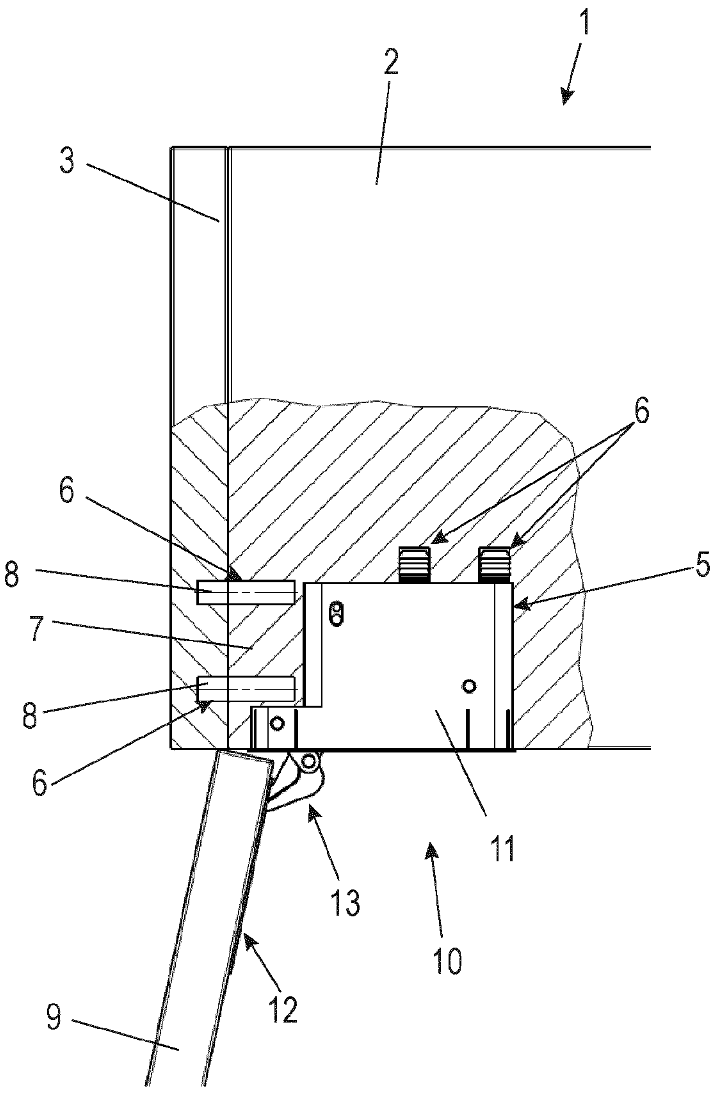
Figure 3A:
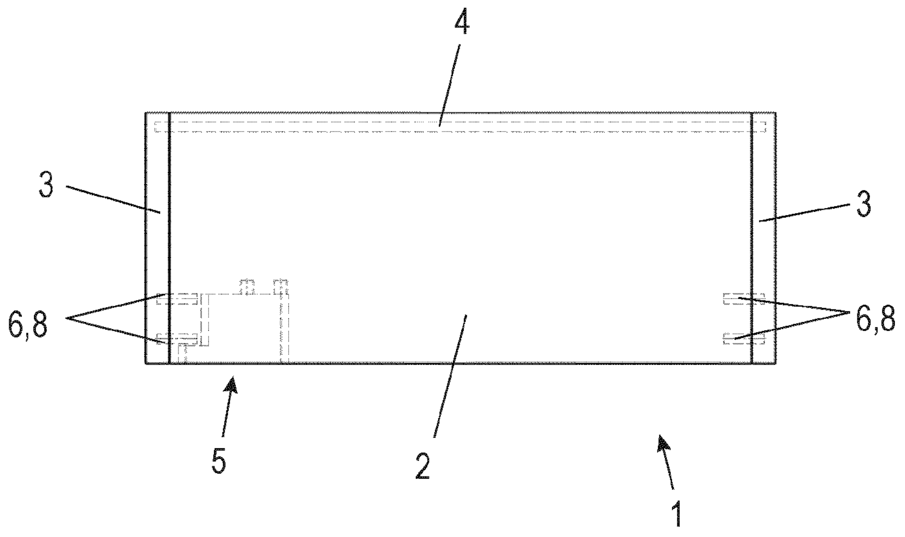
Figure 3B:
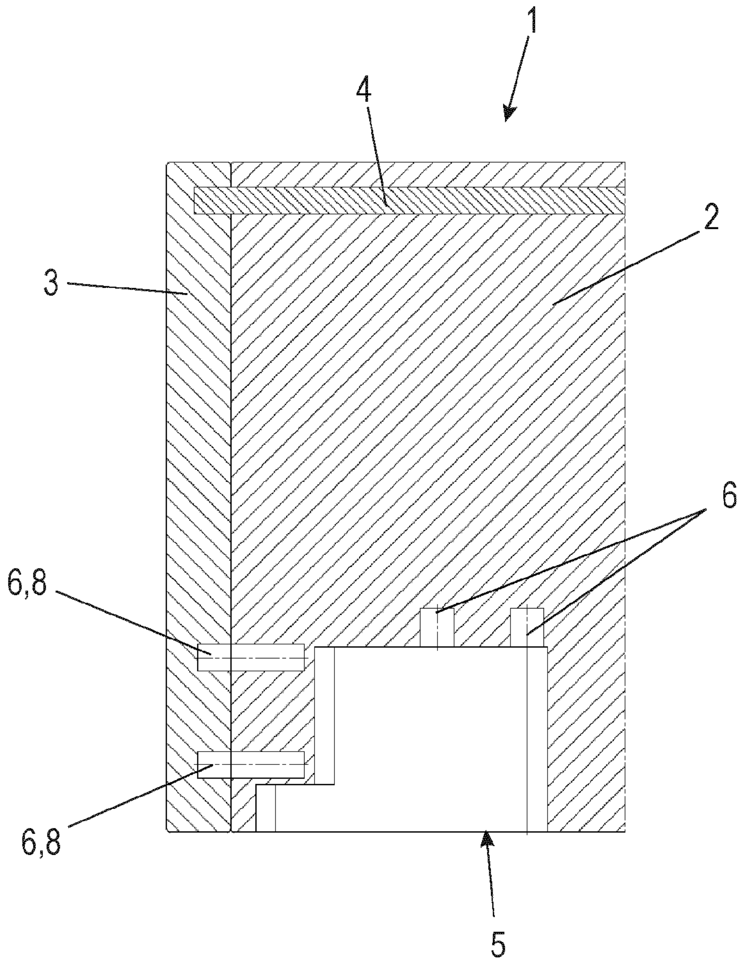

The invention is explained in greater detail hereinafter on the basis of exemplary embodiments with the aid of figures. In the figures:

FIGS. 1*a, b* show an isometric view of a furniture carcass having closed or open furniture door, respectively;

FIG. 2 shows a top view of a corner region of the furniture carcass according to FIG. 1*b* in an illustration in partial section;

FIG. 3*a* shows a top view of the furniture carcass of FIGS. 1*a, b* without furniture door and without hinges;

FIG. 3*b* shows a sectional view of an edge region of the furniture carcass according to FIG. 3*a;*

Figure 4A:
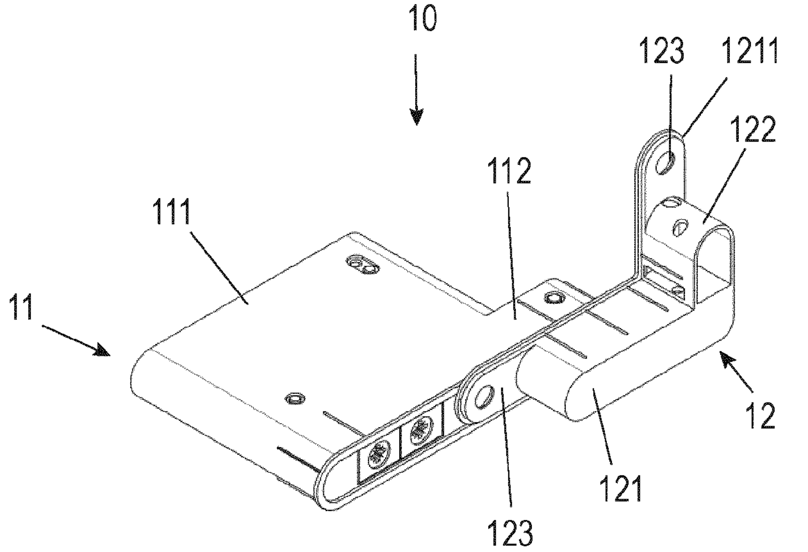
Figure 5B:
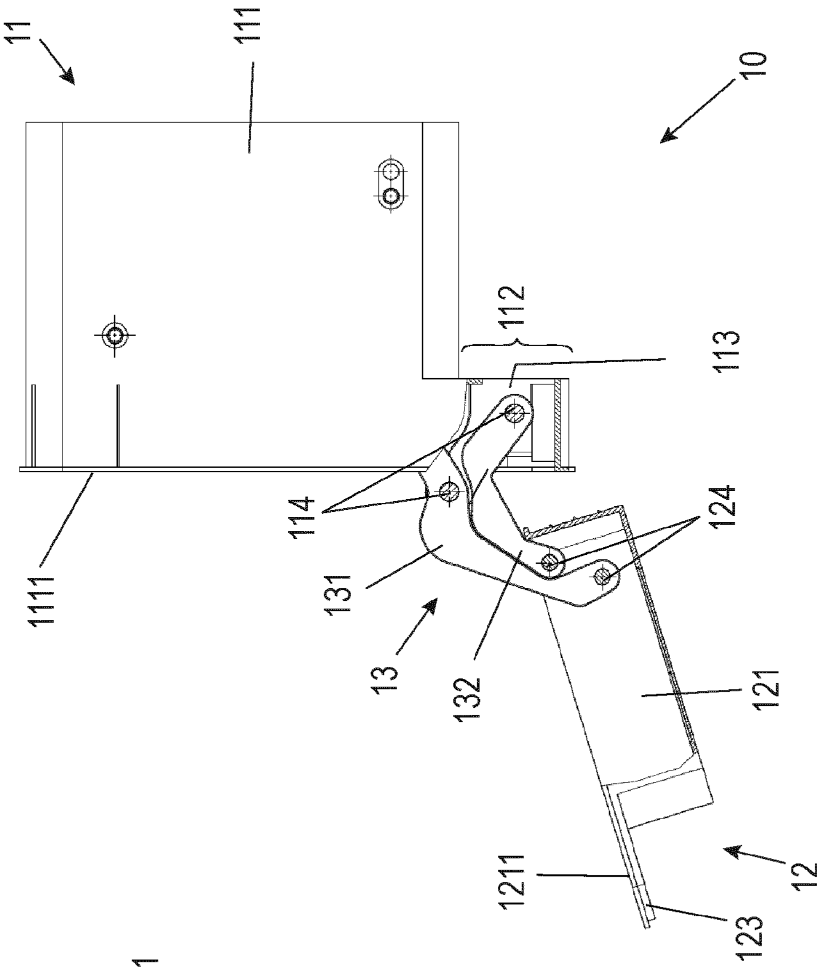
Figure 5A:
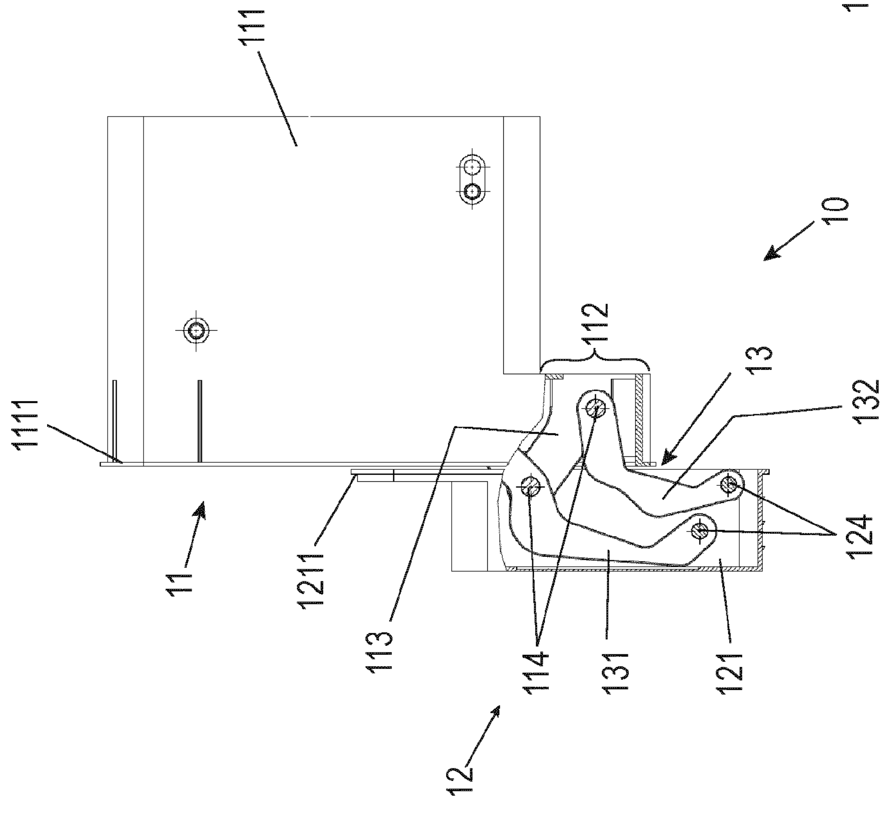
Figure 6A:
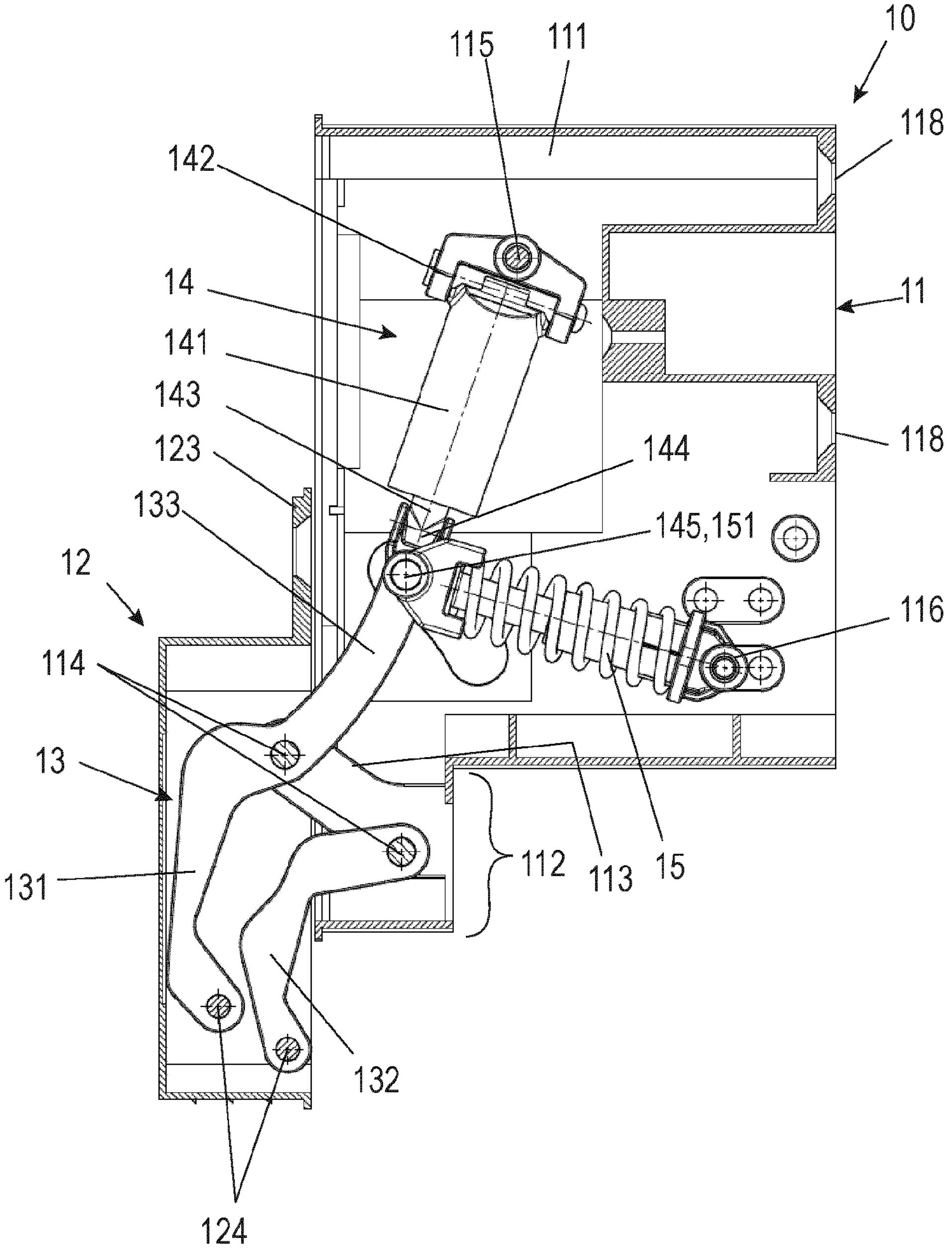
Figure 6C:
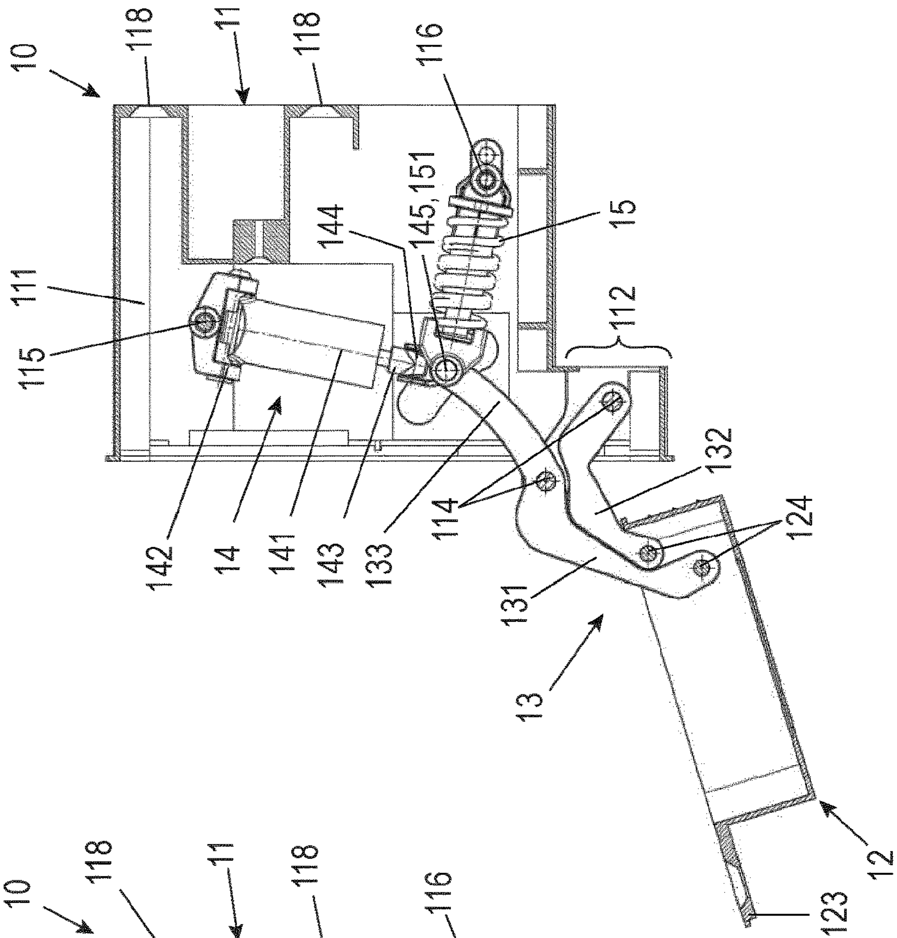
Figure 6B:
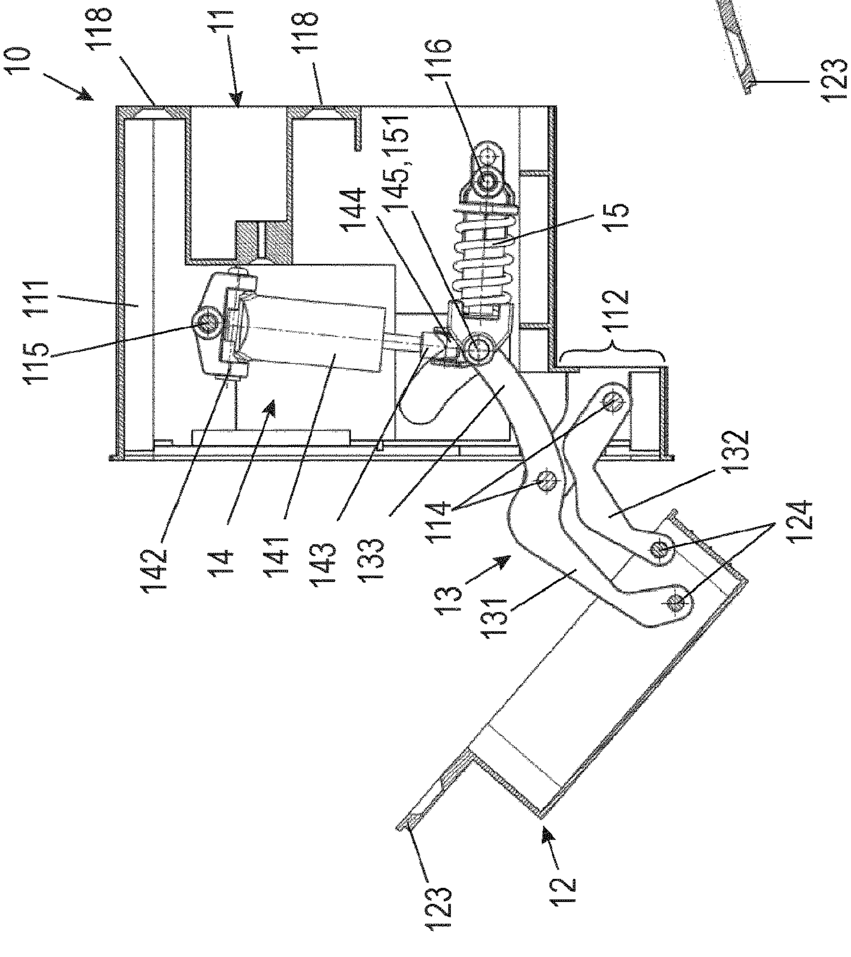
Figure 7A:
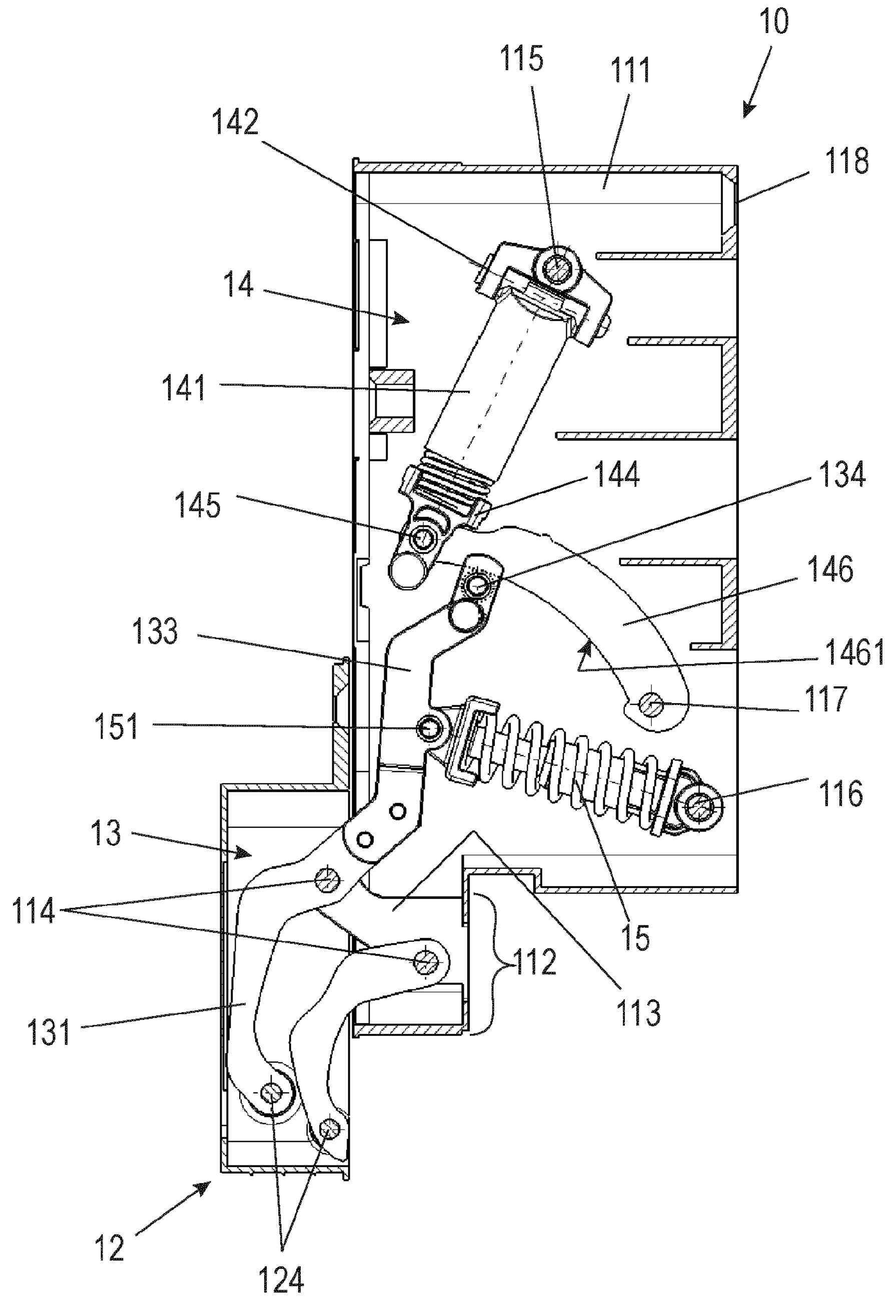
Figure 7C:
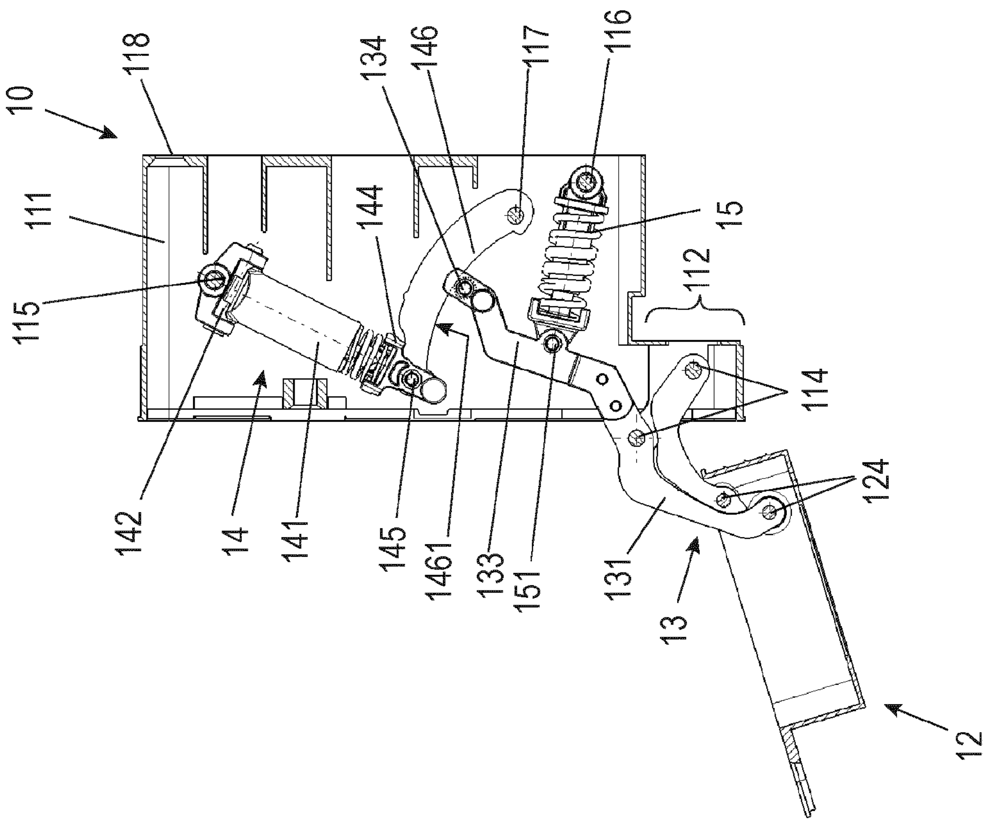
Figure 7B:
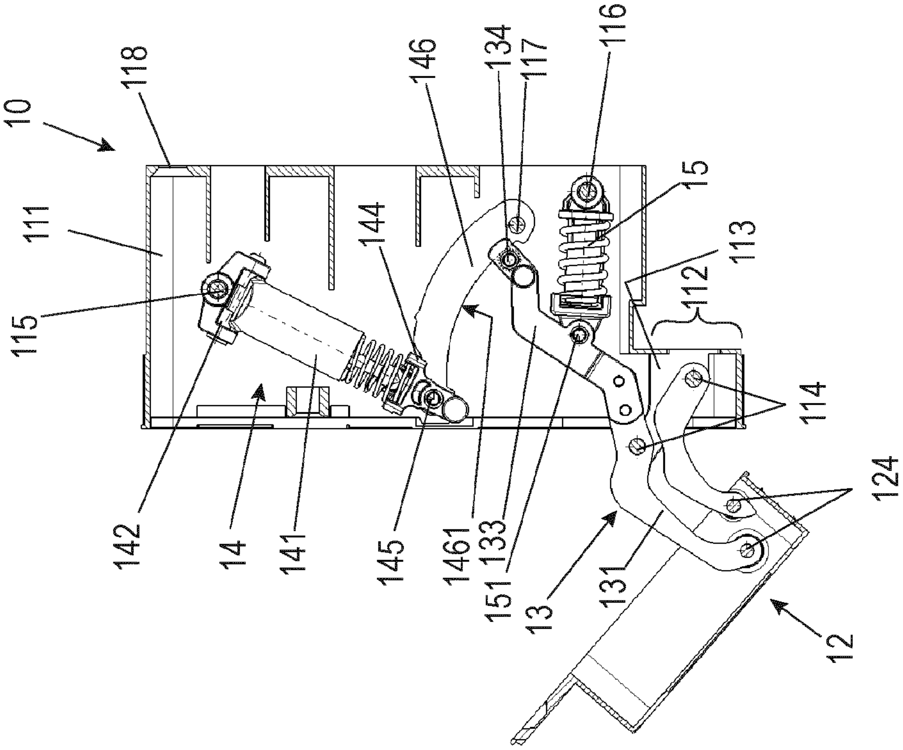
Figure 8A:
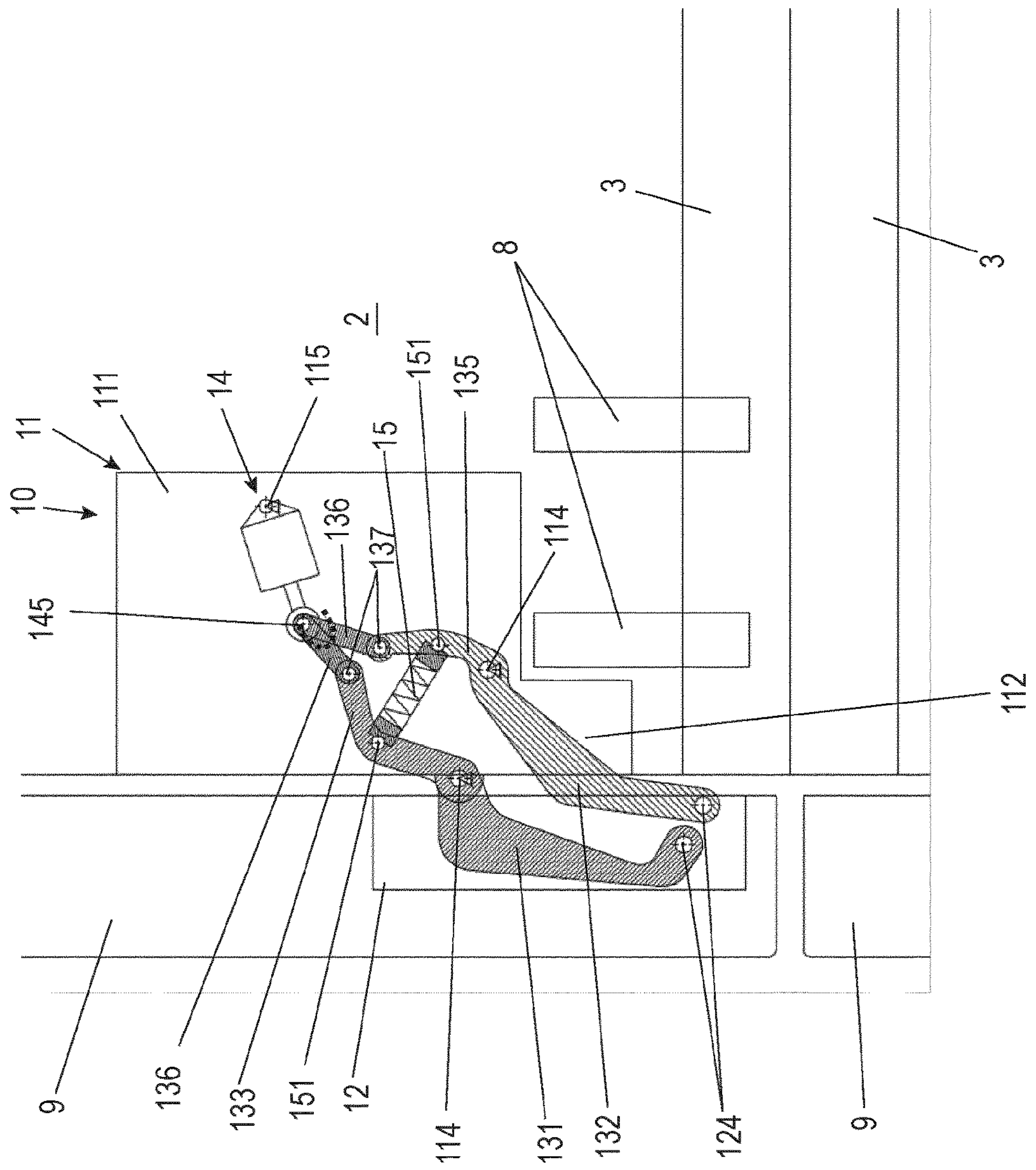
Figure 8C:
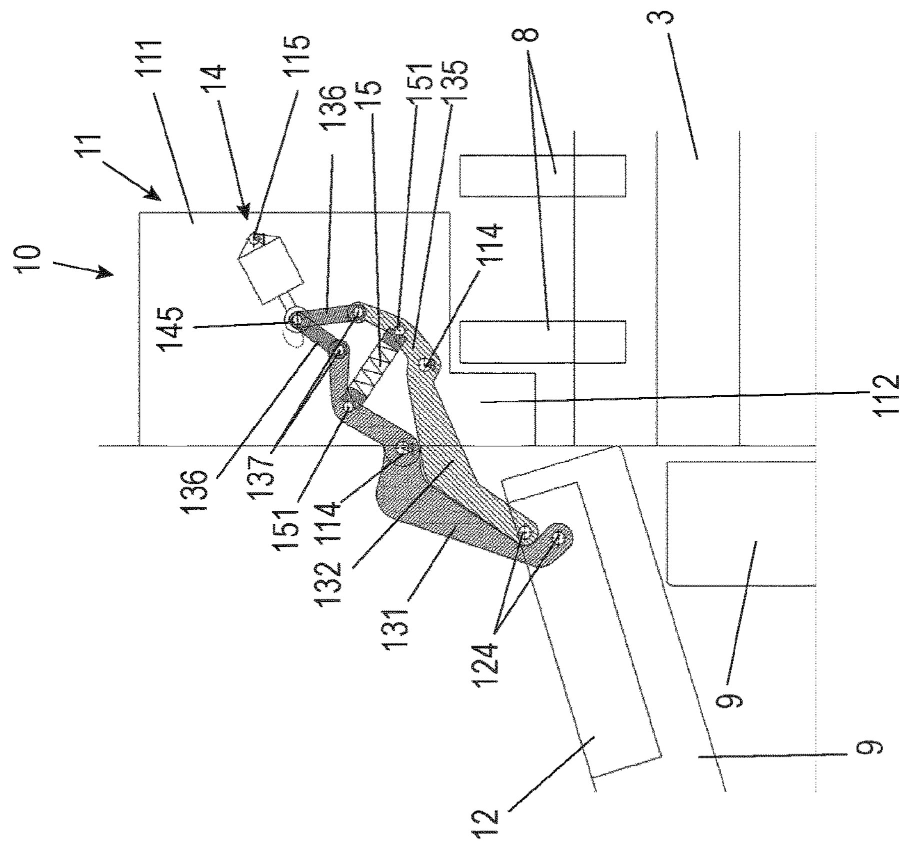
Figure 8B:
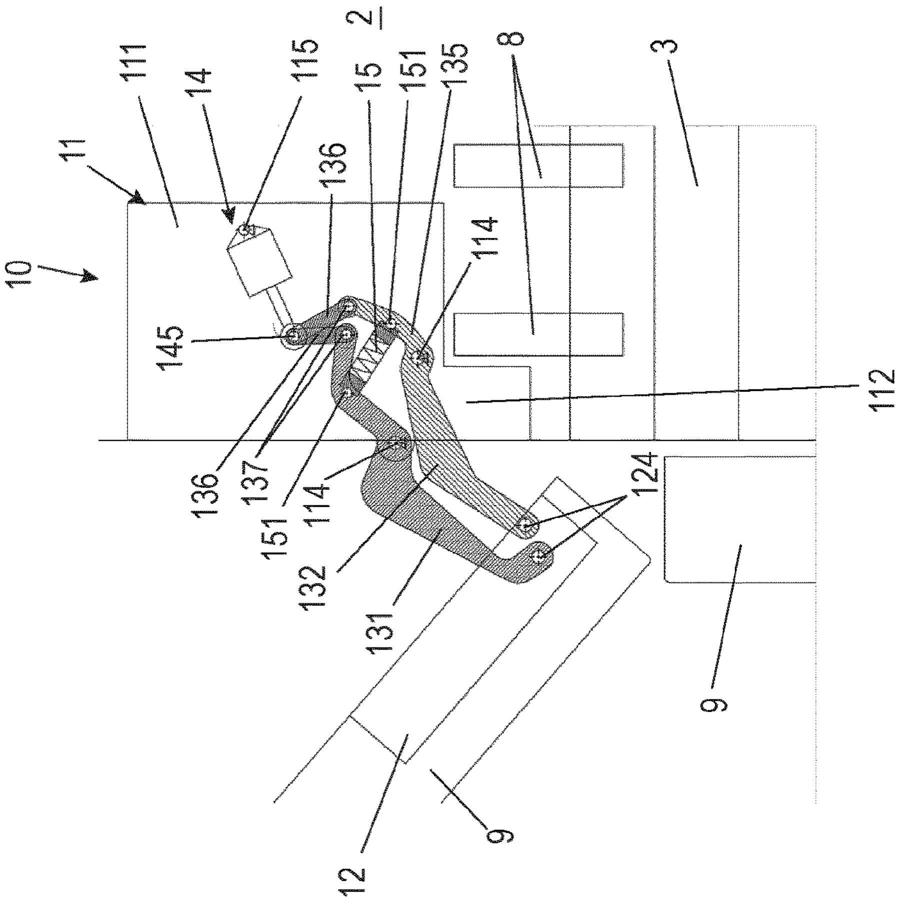
Figure 9A:
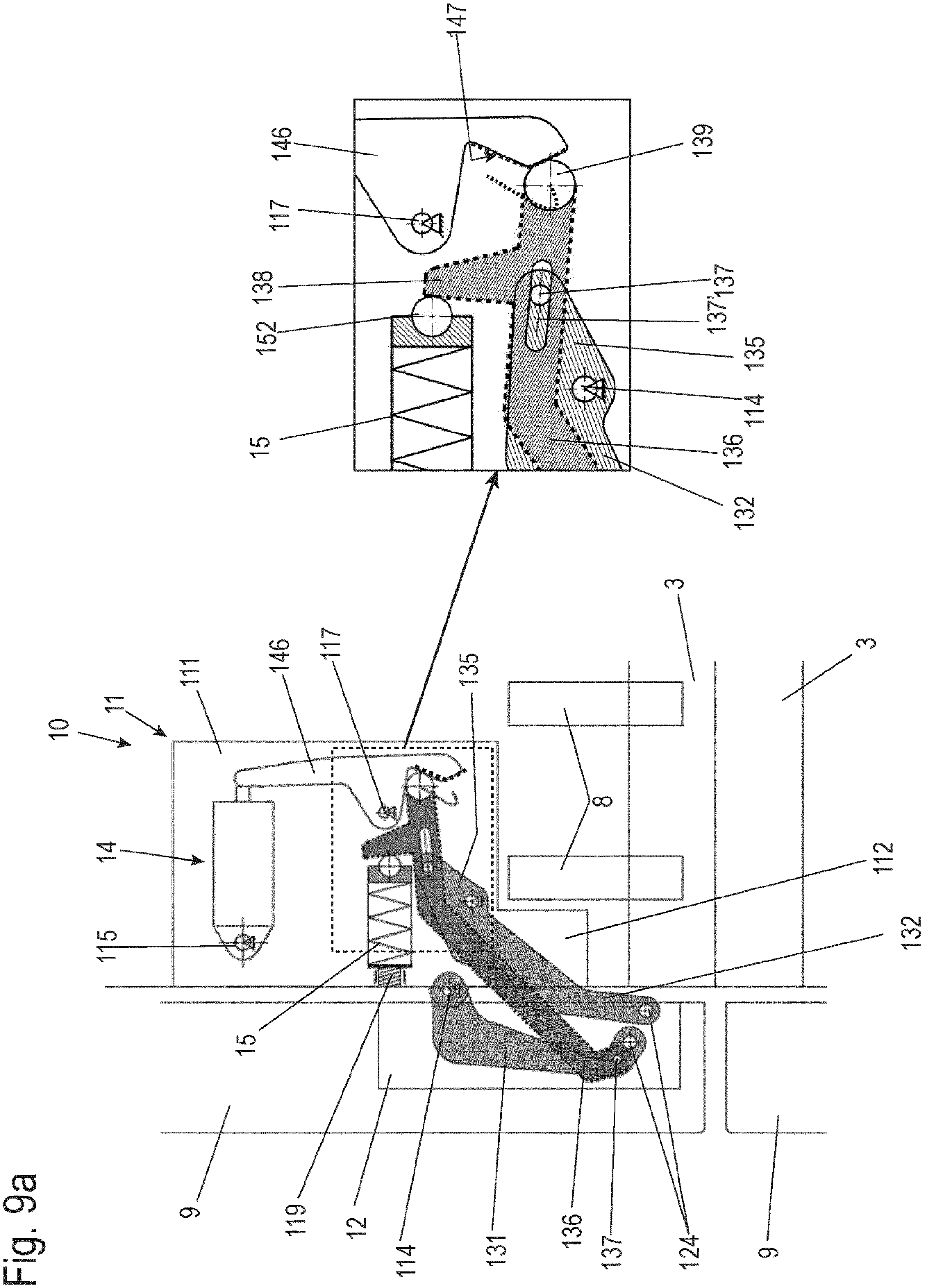
Figure 9C:
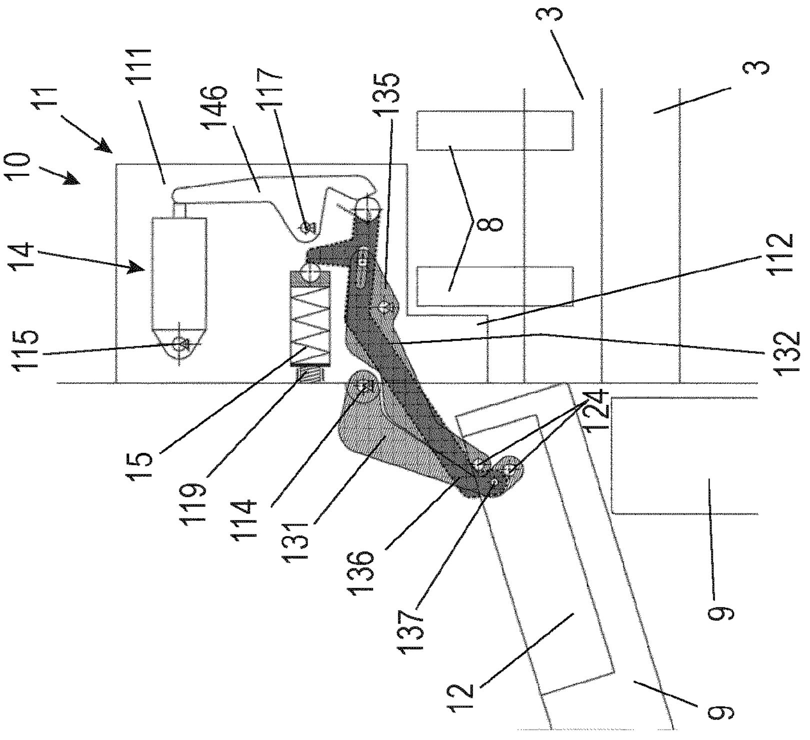
Figure 9B:
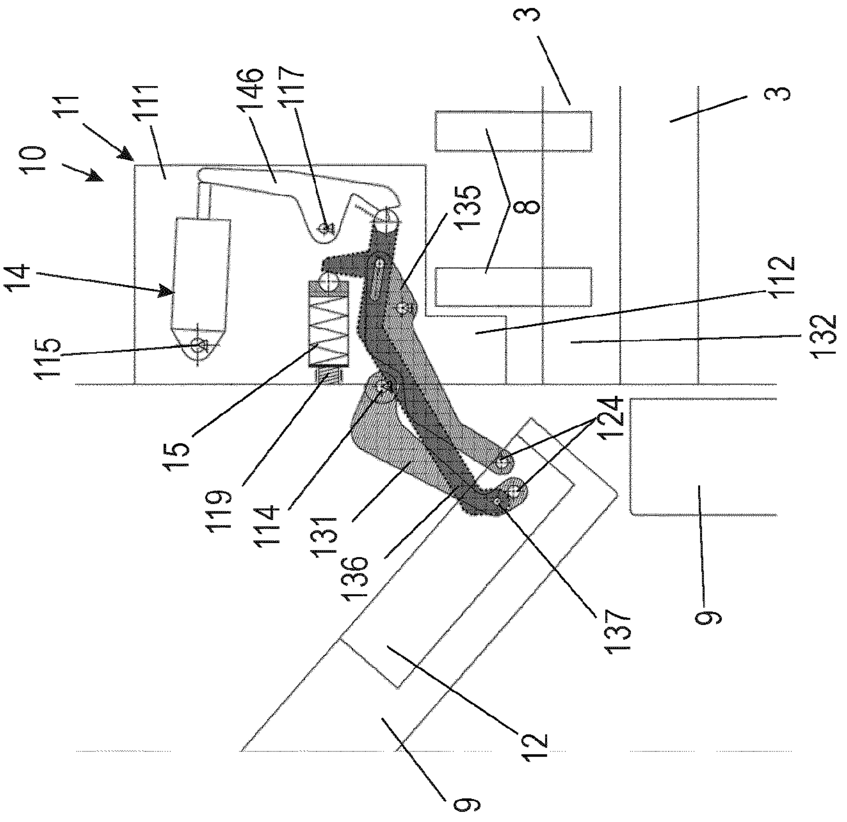

FIGS. 4*a, b* show an isometric view of a first exemplary embodiment of a hinge in a closed or an open state, respectively;

FIGS. 5*a, b* show a top view of the hinge in the first exemplary embodiment in a closed or an open state, respectively;

FIGS. 6*a-c* show a detailed isometric view of the hinge in the first exemplary embodiment in a closed, a partially open, and a completely open state, respectively;

FIGS. 7*a-c* show a detailed isometric view of a second exemplary embodiment of a hinge in a closed, a partially open, and a completely open state, respectively;

FIGS. 8*a-c* show a detailed isometric view of a third exemplary embodiment of a hinge in a closed, a partially open, and a completely open state, respectively;

FIGS. 9*a-c* show a detailed isometric view of a fourth exemplary embodiment of a hinge in a closed, a partially open, and a completely open state, respectively;

FIGS. 10*a-d* show a detailed isometric view of a fifth exemplary embodiment of a hinge in a closed, two different partially open, and a completely open state, respectively; and FIGS. 11a-16b show various embodiments of main levers of a lever mechanism of a hinge in each case in a closed and an open state of the hinge.

DETAILED DESCRIPTION

An example of a furniture carcass 1 having a furniture door 9 is shown in an isometric view in each of FIGS. 1a, b.

By way of example, the carcass of a cabinet which is not very deep, for example, a wall unit, is shown as the furniture carcass 1. It is obvious that the illustrated furniture carcass 1 is solely an example of the use of a hinge according to the application and the hinge can be used in other furniture carcasses or pieces of furniture having a furniture door.

The furniture carcass 1 comprises two panels 2, a top panel and a bottom panel. These are arranged between two side walls 3. The furniture carcass 1 furthermore has a rear wall 4.

A furniture door 9 attached on the left side is provided in the example of FIGS. 1a and 1b, which is pivotably guided by hinges 10. The pivot axis extends in parallel and in the region of a front narrow side of the left side wall 3 in the figure.

Terms used in the context of the description such as "top", "bottom", "left", "right" each relate to the exemplary illustration in the relevant figure. In contrast, the terms "front" and "back" relate to the furniture carcass 1, wherein the front side of the furniture carcass is the side facing toward the user, which is closed by the furniture door 9.

The furniture door 9 is shown in FIG. 1a in a closed position and in FIG. 1b in an open position. The movement of the furniture door 9 guided by the hinges 10 is a combined pivoting and sliding movement, by way of which it is possible to open the furniture door with small gap dimension of the furniture door in relation to adjacent pieces of furniture. Such a movement of the furniture door 9 is achieved by design of the hinges 10 as 4-joint hinges.

As is apparent in FIG. 1b, the hinges 10 are integrated in the respective panel 2. In this way, the interior of the furniture carcass 1 and in particular the side wall 3 remain free of hinge components, whereby the interior can be designed freely. In particular, there are no restrictions on the positions at which intermediate panels or other classification or sorting systems can be arranged in the furniture carcass 1.

FIG. 2 shows a top view in partial section of the furniture carcass 1 having open furniture door 9 in the region of the hinge 10. The furniture carcass 1 is shown in section in the region of the hinge 10 to obtain a view into the arrangement of the hinge 10 and its geometry inside the panel 2.

The hinge 10 has a first hinge part 11, which is coupled via a lever mechanism 13 to a second hinge part 12. Both hinge parts 11, 12 can be pivoted in relation to one another via the lever mechanism 13.

The first hinge part 11 is incorporated essentially flush—possibly except for a circumferential contour—into the panel 2. For this purpose, the panel 2 has a corresponding recess 5, which is milled into the panel 2, for example. The second hinge part 12 is designed in the form of a hinge pot and is incorporated flush into the furniture door 9 possibly except for the mentioned contour, which can rest like a collar on the surface of the end face of the panel 2.

The first hinge part 11 has an essentially cassette-shaped flat housing, the thickness of which is designed so that the recess 5 can be introduced into the panel 2 without it breaking out on the top, intermediate, or bottom side during the milling of the recess 5. At typical thicknesses of the panels 2 in the range of approximately 15-25 millimeters (mm), the housing of the first hinge part 11 has a thickness, for example, in the range of approximately 9-15 mm. As FIG. 2 shows, the housing of the first hinge part 11 is wider in a front region, which extends up to the narrow edge of the panel 2, than in a rear region, with which the first hinge part 11 protrudes deeper into the panel 2. The housing of the first hinge part 11 is thus formed stepped in this horizontal plane, in which the panel 2 is located and in which the lever mechanism 13 is also located.

Due to this step, a significantly wider edge 7 remains adjacent to the rear region of the first hinge part 11 from the panel 2 than in the front region. The front region, in which the first hinge part 11 is wider, extends over a depth in the range of approximately 10-20 mm. The remaining edge 7 located behind it stabilizes the panel 2 in this region and can advantageously be used to accommodate connecting elements between the panel 2 and the side wall 3. In the example shown, dowel holes 6 corresponding to one another are introduced into the panel 2 and the side wall 3, in which concealed dowels 8 are inserted. It is obvious that alternative connecting elements such as screws, slats, or eccentric connectors can be used instead of or in addition to the mentioned dowels.

Further dowel holes 6 are provided in the rear region of the recess 5. These accommodate dowel elements which are installed on the first hinge part 11 and are used for fastening the first hinge part 11 in the panel 2.

A top view from above of the furniture carcass 1 is shown in FIG. 3a, wherein concealed lines are shown by dashed lines. Only the furniture carcass 1 without hinge 10 and without furniture carcass 9 is shown in FIG. 3a. On the basis of the concealed lines, on the one hand, the rear wall can be recognized, which extends up into the side walls 2 and can also be used as connecting element between side wall 3 and panel 2. Alternatively, or additionally, dowels can also be inserted in the rear region of the furniture carcass 1 between the panel 2 and the side wall 3.

On the other hand, the position of the recess 5 can be recognized on the basis of the concealed lines. Dowels 8 are provided in the front region adjacent to the recess 5 in the remaining edge 7 between panel 2 and side wall 3 as already apparent from FIG. 2. At the same position, such dowels 8 are also arranged in dowel holes 6 to connect the panel 2 to the opposite side wall 3.

FIG. 3a shows that due to the stepped formation of the housing of the first hinge part 11 and the edge 7 thus remaining, the same connecting technology can be used between the panel 2 for both side walls 3. In other words, a typical connecting technology which has been established in furniture carcasses 1 between panel 2 and side wall 3 can also be carried out upon use of the incorporated hinge 10 according to the application.

FIG. 3b shows the edge region of the furniture carcass 1 with the recess 5 enlarged once again and in greater detail in a sectional illustration, wherein the section is executed in a plane parallel to the surface of the panel 2.

A first exemplary embodiment of a hinge 10 is shown in greater detail in FIGS. 4a-6c.

Figure 4B:
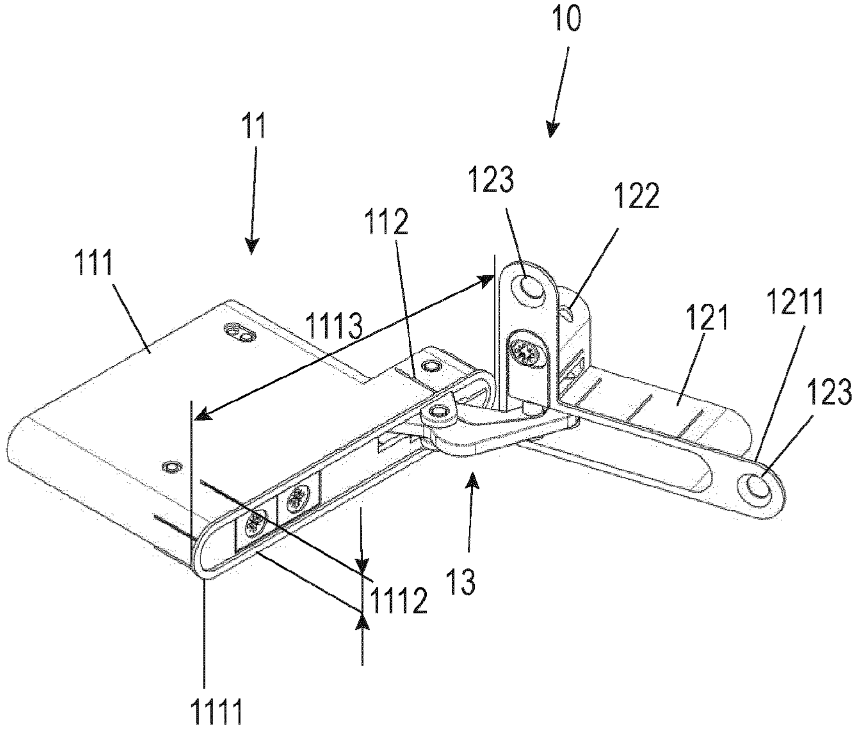

The hinge 10 is shown in an isometric illustration in a closed or open state, respectively, in FIGS. 4a and 4b. FIGS. 5a and 5b show top views of the hinge 10, also in the closed or open state.

The first hinge part 11 has a cassette-shaped housing 111, having two plates arranged parallel to one another, between which components of the hinge 10 are arranged. The housing can be in multiple parts and can be formed, for example, by two half shells. Sides of the housing 111 are formed rounded in the form of semicylinders to adapt the shape of the housing 111 to the shape of milled openings in the panel 2 of the furniture carcass 1. The housing 111 can thus be inserted precisely fitted into the milled recess 5 (cf. FIG. 2). The section protruding on one side of the housing 111 in the front region is identified in the figures with the reference sign 112. The housing section 112 is arranged on the side of the housing 111 at which the lever mechanism 13 exits from the housing 111 in the open position (FIG. 4*b*).

The second hinge part 12 has a hinge pot 121, also synonymously referred to as a pot housing 121 hereinafter, which is embodied as L-shaped in the present example and comprises a transverse section 122. Protruding fastening tabs 123 having fastening holes are provided at both ends of the pot housing 121, which is L-shaped in this example. Instead of the L shape, the hinge pot can also have another shape.

The tabs 123 rest on the surface of the furniture door 9 and can be fastened via screws on the furniture door 9. Otherwise, the pot housing 121 including its transverse section 122 is incorporated into the material of the furniture door 9. The sides of the pot housing 121 are rounded in the form of semicylinders as in the housing 111 to be able to be inserted in a precisely fitted manner into a corresponding milled opening of the furniture door 9.

Adjustment elements can be arranged in the housing 111 and also the pot housing 121 to be able to adjust a lateral, depth, and/or vertical position of the furniture door 9. The location of the furniture door 9 relative to the furniture carcass 1 can be adjusted using these adjustment elements, for example, to be able to align the furniture door in relation to adjacent furniture fronts.

In the illustrations of FIGS. 5*a*, 5*b*, the housing 111 is shown cut away in the region of the housing 112, as is the pot housing 121, to show the arrangement of the lever mechanism 13 in this region. As a 4-joint mechanism, the lever mechanism has an outer main lever 131 and an inner main lever 132. These are rotatably linked on a carrier 113, which is arranged in the region of the housing section 112. The carrier 113 provides two pivot points 114, on which the main levers 131, 132 are mounted.

A rotatable mounting of a component (for example the main lever here), which is fixed in relation to the housing 111 and thus fixed in relation to the furniture carcass 1, is referred to as a pivot point in the context of the application. Rotation mountings that are not fixed in relation to the housing 111, for example, because they are located on a lever movable in turn, inter alia, are referred to as linkage points. It is obvious that both a pivot point and also a linkage point can be implemented in various ways, for example, in the form of axles, rivets, bolts, etc.

The main levers 131, 132 are rotatably mounted in linkage points 124 on the side of the second hinge part 12. As a result of the formation as a 4-joint hinge, the second hinge part 12 executes a rotating and sliding movement relative to the first hinge part 11. For reasons of simpler illustration, the combined rotating and sliding movement is referred to as a pivot movement in the context of this application. The shaping of the main levers 131, 132 is such that in the open state of the hinge 10, they can press against one another as precisely fitted as possible. The largest possible opening angle is thus achieved and at the same time a stop is defined for the open position of the hinge 10.

In FIGS. 6*a*-6*c*, the hinge 10 is shown in a sectional illustration, wherein the section was executed just below the upper plate of the housing 111, so that the internal structure of the hinge 10 is visible. The figures show an opening sequence of the hinge 10, which is illustrated in FIG. 6*a* in the closed position, in FIG. 6*b* in a partially open position, and in FIG. 6*c* in a completely open position.

In the hinge 10, the outer main lever 131 is formed as a two-sided lever and accordingly has an extension 133 beyond the pivot point 114. This extension 133 of the outer main lever 131 protrudes into the interior of the housing 111.

A damper 14 is arranged in the housing 111, formed in the present case as a linear damper having a cylinder 141, in which a piston (not visible here) moves in a damped manner and which is connected to a piston rod 143. The damper 14 is connected at one end, in the present case the end of the cylinder 141, in a pivot point 115 to the housing 111. In addition to the rotation around the pivot point 115, a rotation around an axis perpendicular thereto is enabled by a pivot joint 142. This rotation is relevant, for example, if the hinge 10 offers an adjustment option for a vertical position of the furniture door 9, which takes place via an inclination adjustment of the lever mechanism 13 and in particular of the outer main lever 131. In this case, a pivot joint 144 is also provided at the end of the piston rod. The piston rod 143 is linked via this pivot joint 144 to a linkage point 145 at the end of the extension 133 of the outer main lever 131.

Furthermore, a compression spring 15, which is rotatably mounted in a pivot point 116 with one end fixed in relation to the housing 111, is arranged as an energy or force accumulator in the housing 111. At the other end, the compression spring 15 is also connected with a linkage point 151 to the extension 133 of the outer main lever 131. In the illustrated exemplary embodiment, the linkage point 145 of the damper 14 and the linkage point 151 of the compression spring 15 coincide. A central linkage point is thus formed between the end of the extension 133, the damper 14, and the compression spring 15.

As a comparison of the positions of the outer main lever 131 or the extension 133 in FIGS. 6*a*-*c* shows, the central linkage point 145, 151 executes a pivot movement in such a way that the damper 14 is extended farther in an intermediate position (cf. FIG. 6*b*) in relation to both end positions (completely closed or completely open), whereas the compression spring 15 is more strongly compressed in the intermediate position than in the end positions. In this way, damping of the approach to both the closed and also the open end position is achieved. Furthermore, due to the compression spring 15, the hinge 10 is pre-tensioned both in the closed and also in the open position, whereby a holding-closed or holding-open function is achieved.

In the rear region of the housing 11, two fastening options 118 in the form of screw holes are provided, via which the housing 111 can be fastened in the recess of the panel 2. It is possible to screw screws directly through this fastening option 118 into the panel 2 or also to fasten dowel sections on the housing 111 using the fastening option 118, which dowels engage in corresponding dowel holes 6, as shown in FIG. 2.

A second exemplary embodiment of a hinge 10 is shown in FIGS. 7*a*-7*c* in the same way as in FIGS. 6*a*-6*c*. Identical reference signs identify identical or identically acting elements as in the first exemplary embodiment in these and also the next figures. Reference is made to the first exemplary embodiment with respect to the basic structure of the hinge 10. In particular, the housing shape of the housing 111 having the housing 111 widened only in the front region is also implemented by the housing section 112 in this and the following exemplary embodiments.

In this exemplary embodiment a damper 14 and a compression spring 15, which interact with an extension 133 of the outer lever 131 are also arranged in the housing 111. However, in contrast to the first exemplary embodiment, the compression spring 15 and the damper 14 are not coupled to the extension 133 in a central shared linkage point. Instead, the compression spring 15 is connected in a linkage point 151 directly to the extension 133, whereas the damper 14 interacts via a control curve lever 146 with the extension 133. For this purpose, an arc-shaped control curve lever 146 is rotatably mounted on the housing 111 at one end in a pivot point 117 and an opposing free end of the control curve lever 146 is connected in the linkage point 145 to the piston rod 143 of the damper 14. A rotatable roller 134, which rolls on a control curve 1461 of the control curve lever 146, is fastened at the free end of the extension 133 of the outer main lever 131.

As a comparison of FIGS. 7*a-c* of the opening sequence of the hinge 10 shows, the compression spring 15 is also compressed more strongly in an intermediate position (cf. FIG. 7*b*) than in the end positions in this embodiment, whereas the damper 14 is extended farther in the intermediate position than in the end positions.

As in the first exemplary embodiment, damping is thus achieved upon approaching both end positions and also a holding-closed function in the closed state and a holding-open function in the open state are achieved. In this exemplary embodiment, the angle dependency of the damping effect can advantageously be influenced by the option of the design of the shape of the control curve 1461.

Two further embodiments of a hinge 10 according to the application are shown in FIGS. 8*a-c* and 9*a-c* in a way comparable to FIGS. 6*a-c* and 7*a-c*. In contrast to the above-described figures, FIGS. 8*a-c* and 9*a-c* are kept somewhat more schematic and show the hinge 10 in an installation situation in a furniture carcass which is arranged adjacent to a further furniture carcass. A side wall 3 and a furniture door 9 are shown of the further furniture carcass.

The structure of the hinges 10 of FIGS. 8*a-c* and 9*a-c* fundamentally corresponds to those of the above-described exemplary embodiments, to which reference is hereby explicitly made. In contrast to the above-described exemplary embodiments, the outer main lever 131 and the inner main lever 132 are formed longer than in the preceding exemplary embodiments, whereby the pivot points 114 are no longer in the region of the housing section 112, but farther in the main section of the housing 111. However, at least the inner main lever 132 leads through the housing section 112.

In the example of FIGS. 8*a-c*, both main levers 131, 132 are extended into the interior of the housing 111. In addition to the extension 133 of the outer main lever 131, an extension 135 of the inner main lever 132 thus also projects into the housing 111.

A damper 14 and a compression spring 15 are again arranged in the housing 111. The compression spring 15 is not fixed on both sides on the housing 111 in this exemplary embodiment, thus does not have a fixed pivot point, but rather is connected at both ends in linkage points 151 to the extension 133 of the outer main lever 131 on one side and the extension 135 of the inner main lever 132 on the other side of the compression spring 15.

The damper 14 is connected as before at one side, for example again the side of the cylinder, in a pivot point 115 to the housing 111. The opposite side of the damper 14, in the present case the piston rod, is coupled in a linkage point 145 to the extensions 133, 135, specifically via two control levers 136 placed in between. Both control levers 136 are rotatably connected to the damper 14 in the mentioned pivot point 145. One of the control levers 136 is connected in a linkage point 137 to the end of the extension 133 of the outer main lever 131 and the other in a linkage point 137 to an end of the extension 135 of the inner main lever 132. A dotted movement curve is indicated in FIGS. 8*a-c*, which the linkage point 145 performs in the course of an opening or closing movement. As in the above-described exemplary embodiments, in comparison to the end positions, the compression spring 15 is compressed more strongly in an intermediate position of the hinge, whereas the damper 14 is deflected farther. Damping results at each of the end positions due to the damper 14 and a holding-closed or holding-open function results due to the compression spring 15.

In the example of FIGS. 9*a-c*, the damper 14 and the compression spring 15 are coupled to the two main levers 131, 132 via an additional control lever 136. This is linked at one end in a linkage point 137 on the outer main lever 131. An extension of the main lever 131 (cf. extension 133 in the above-illustrated exemplary embodiments) is not necessary in this exemplary embodiment. In contrast, the inner main lever is formed, similarly as in the example of FIGS. 8*a-c*, as a two-sided lever and accordingly has an extension 135. The control lever 136 is coupled to this extension 135, which is recognizable well in the enlargement of the corresponding detail in FIG. 9*a*. This coupling has a linkage point 137 at the extension 135, which is guided in the control lever 136 in an oblong hole 137', which also represents a control curve in this meaning.

The control lever 136 ends, on the one hand, in an actuating projection 138 and, on the other hand, in a roller 139. The actuating projection 138 interacts with the compression spring 15, which is fastened on one side in a spring fastening 119 in a longitudinally adjustable manner on the housing 111 in this exemplary embodiment. The opposite free end of the compression spring 15 is also provided with a roller 152, which presses against the actuating projection 138 of the control lever 136. During an opening or closing movement of the hinge 10, the actuating projection 138 moves in the direction of the compression spring 15, whereby it is compressed. The actuating projection 138 also executes a movement in a direction perpendicular to the axis of the compression spring 15 at the same time, which is enabled because of the roller 152, however. The actuating projection 138 can additionally have a curve contour, via which the deflection of the compression spring 15 can additionally be changed in dependence on the hinge position.

A comparison of FIGS. 9*a-c* shows that the compression spring 15 is also compressed more strongly in an intermediate state (see FIG. 9*b*) than in at least one end position in this exemplary embodiment, whereby the holding-closed function and/or the holding-open function in the closed or open end position, respectively, is again achieved.

The damper 14 is connected to the housing 111 with one end rotatably in a pivot point 115 in this exemplary embodiment and is coupled at its other end, in the present case the piston rod, to a control curve lever 146, which is two-sided in this exemplary embodiment. This lever is mounted on the housing 111 rotatably in relation thereto in a pivot point 117. A control curve 1461 is formed on the control curve lever 146 in the region in which the roller 139 of the control lever 136 presses against it.

During the opening or closing procedure of the hinge 10 (cf. sequence of FIGS. 9*a-c*), the roller 139 travels along the control curve 1461 of the control curve lever 146 at the end of the control lever 136, whereby the movement of the main lever 131, 132 is transmitted to the damper 14. A further deflection of the damper 14 in comparison to the end positions is achieved in the intermediate position of FIG. 9*b*. Correspondingly, during the retraction of the damper 14, damping is achieved upon approach to each of the two end positions.

A further exemplary embodiment of a hinge 10 according to the application is again shown in FIGS. 10*a-d* in a manner comparable to FIGS. 6*a-c* and 7*a-c*. The structure of the hinge 10 also fundamentally corresponds here to that of the above-described exemplary embodiments, to which reference is hereby explicitly made. In particular the differences to the above-described exemplary embodiments are explained hereinafter.

As in the examples of FIGS. 6*a-c* and 7*a-c*, pivot points 114 of both main levers 131, 132 are not located in the main section of the housing 111, but in or in front of the housing section 112. Furthermore, the outer main lever 131 is also extended into the main section of the housing 111 as a two-sided lever.

The extension 133 of the outer main lever 131 is coupled in this exemplary embodiment in a linkage point 151 to the compression spring 15. The compression spring 15 is articulated with the extension 133 in this linkage point 151 with an end freely laterally movable in the plane of the lever. The other side of the compression spring 15 is pivotably mounted in the housing 111 in a pivot point 116.

The outer main lever 131 and the inner main lever 132 both act on the damper 14. For this purpose, a control curve lever 146 is linked on the inner main lever 132 in a linkage point 147, which acts via a roller lever 148 on the damper 14. Moreover, an angular position of the control curve lever 146 is influenced by the position of the extension 133 of the outer main lever 131. The cooperation of the levers mentioned is explained in greater detail hereinafter.

The damper 14 is fixed with one side, for example with the side of its cylinder 141 here, pivotably in a pivot point 115 in the housing 111. The opposite side of the damper 14, in the present case thus the end of the piston rod 143, is coupled in a linkage point 145 to the roller lever 148. This roller lever 148 is pivotably mounted in a pivot point 149 on the housing 111.

The roller lever 148 has the shape of a plate, on which two rollers 1481, 1482 are rotatably mounted. Instead of rollers 1481, 1482, bolts having outer roundings can also be used. The rollers 1481, 1482 press against control curves 1461, 1462 of the control curve lever 146.

The control curve lever 146 divides at its free end in a fork or claw shape, whereby an inner concave control curve 1461 and an outer convex control curve 1462 are formed. Depending on the open position of the hinge 10, the roller 1481 is in contact with the control curve 1461 and/or the roller 1482 is in contact with the control curve 1462.

Furthermore, a further control curve 1463 is formed on the lower section of the control curve lever 146 in front of the mentioned fork, on which curve a roller 152 contacts, which is rotatably mounted in the linkage point 151 of the compression spring 15 on the extension 133 of the outer main lever 131. The angular position of the control curve lever 146 is determined by the outer main lever 131 due to the rolling of the roller 152 on the further control curve 1463.

Starting points of the damper 14 and a damping force curve can be set deliberately and differently for the closing damping and the opening damping by the positioning of the rollers 1481, 1482 on the roller lever 148 and the shaping of the control curve 1461-1463.

Figure 10A:
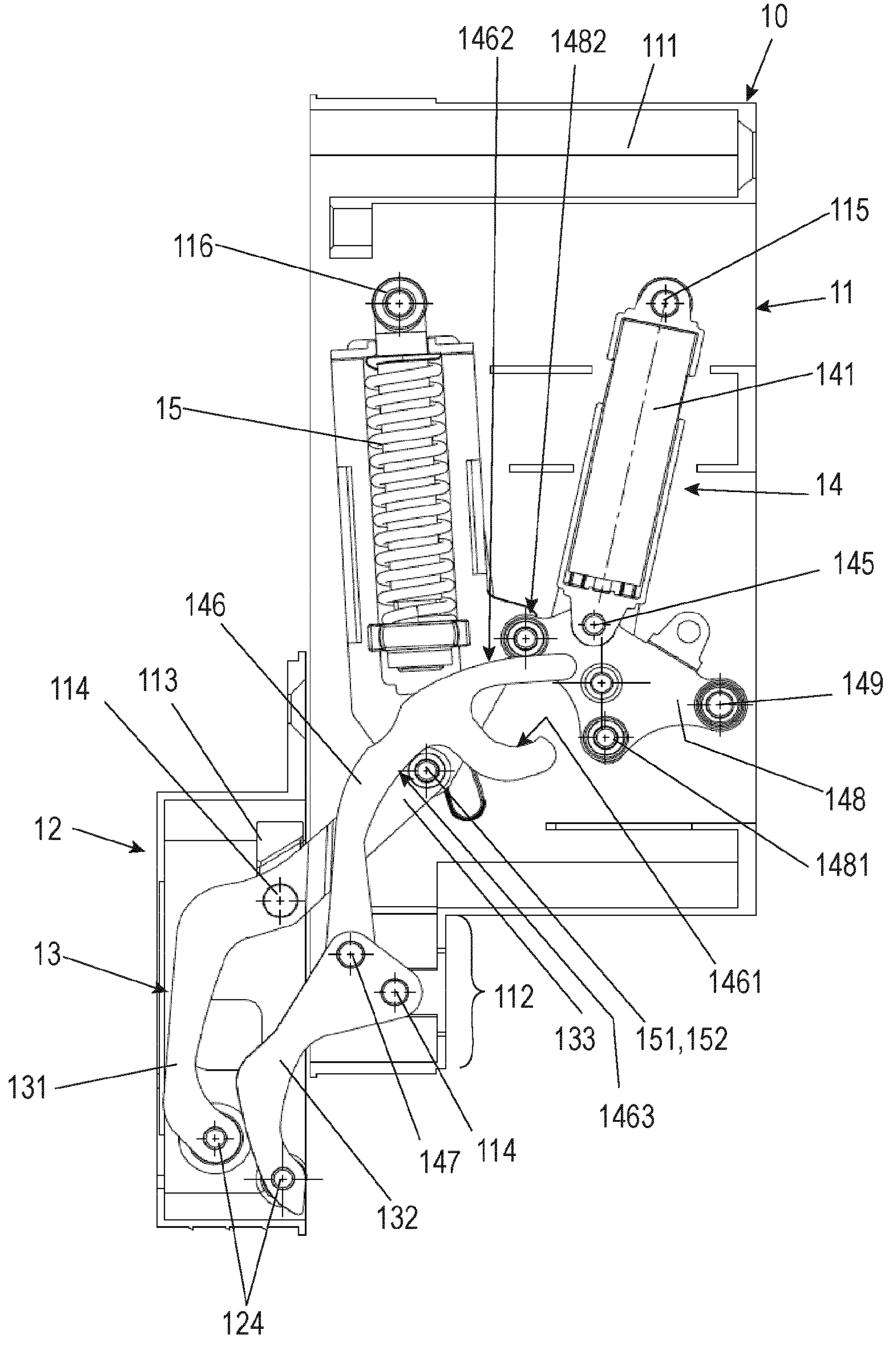

FIG. 10*a* shows the hinge 10 in a closed state. The compression spring 15 is maximally relaxed here and the damper 14 is nearly completely retracted, whereby the force transmission between the control curve lever 146 and the damper 14 takes place via a contact of the roller 1482 with the outer control curve 1462.

Figure 10C:
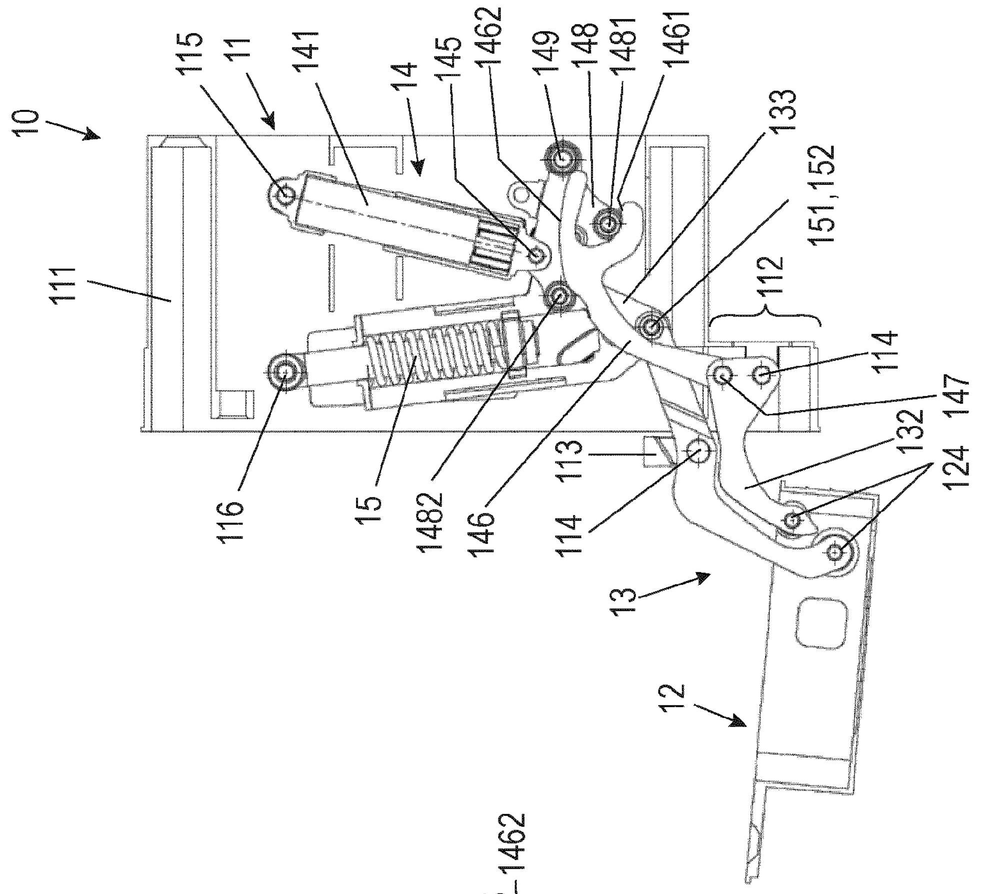
Figure 10B:
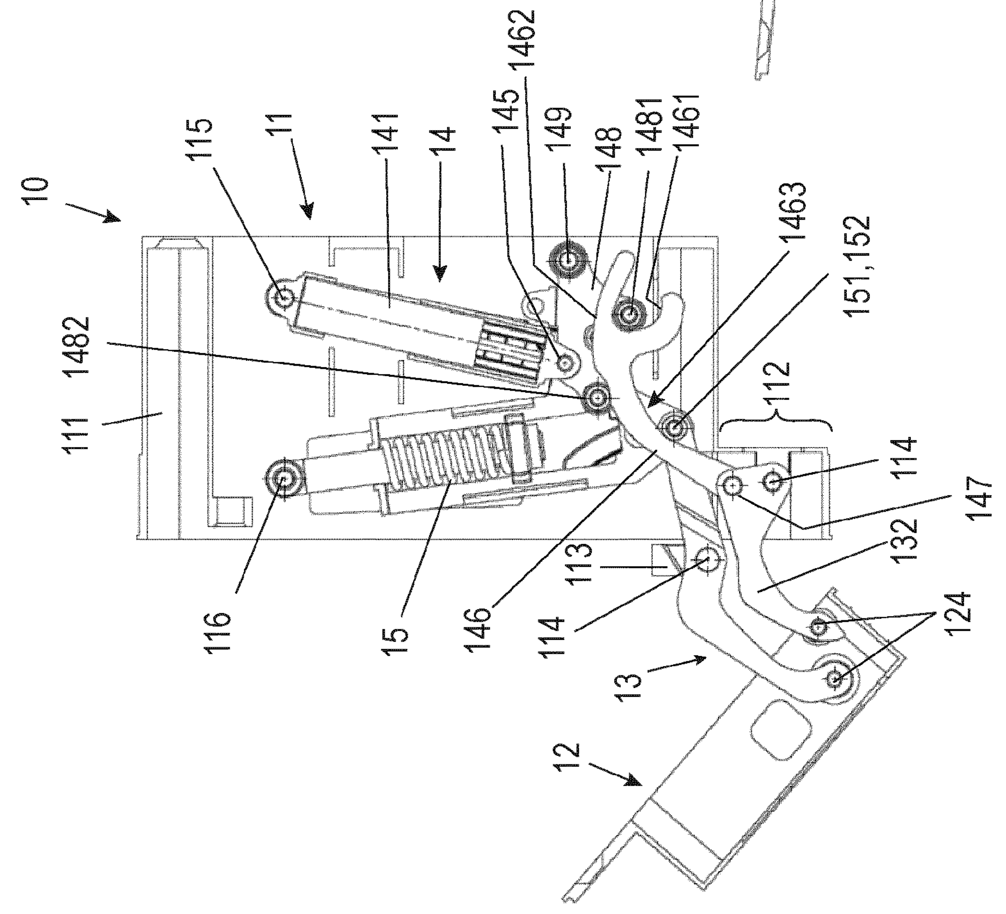
Figure 10D:
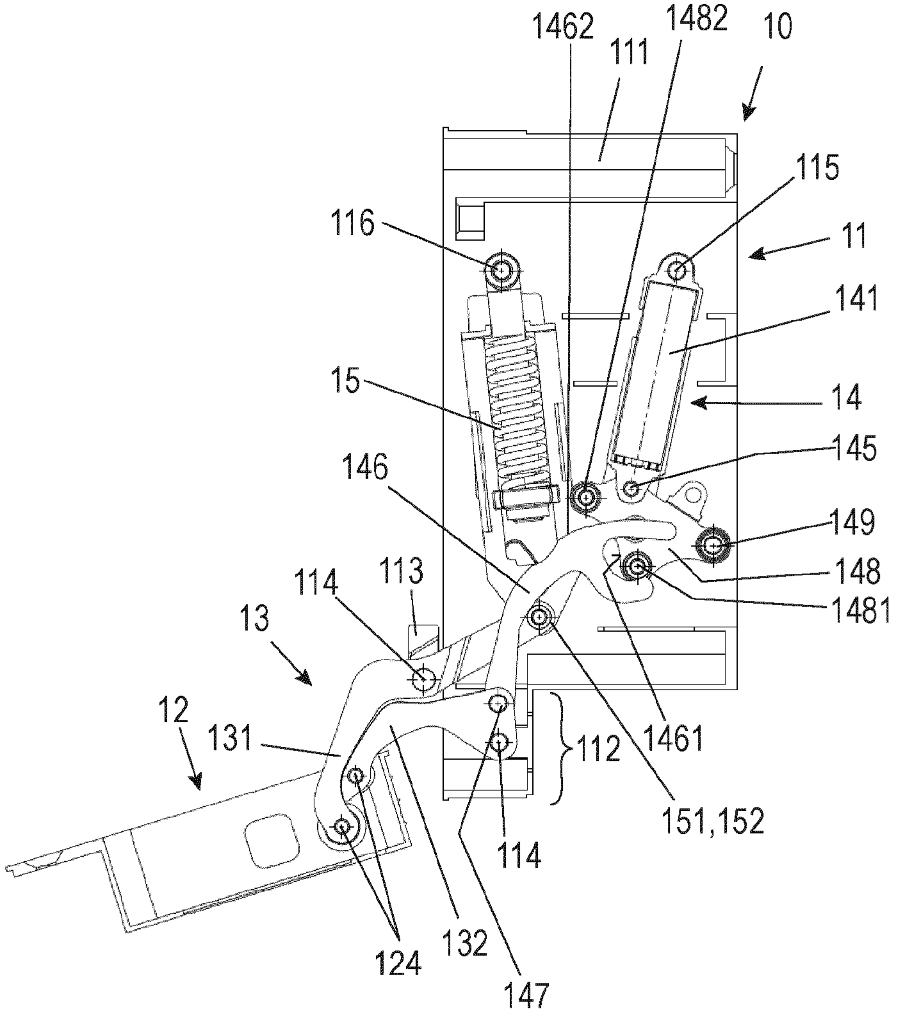
Figure 11A:
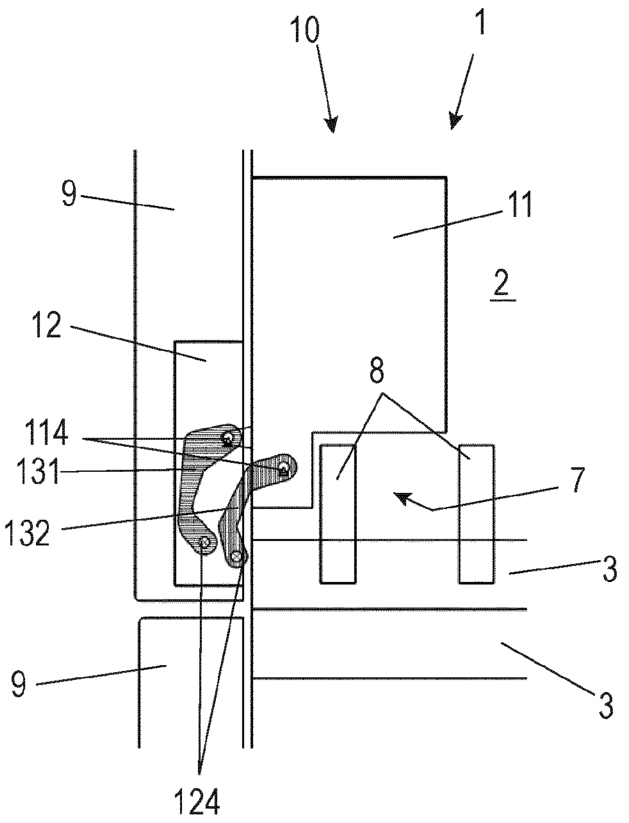
Figure 11B:
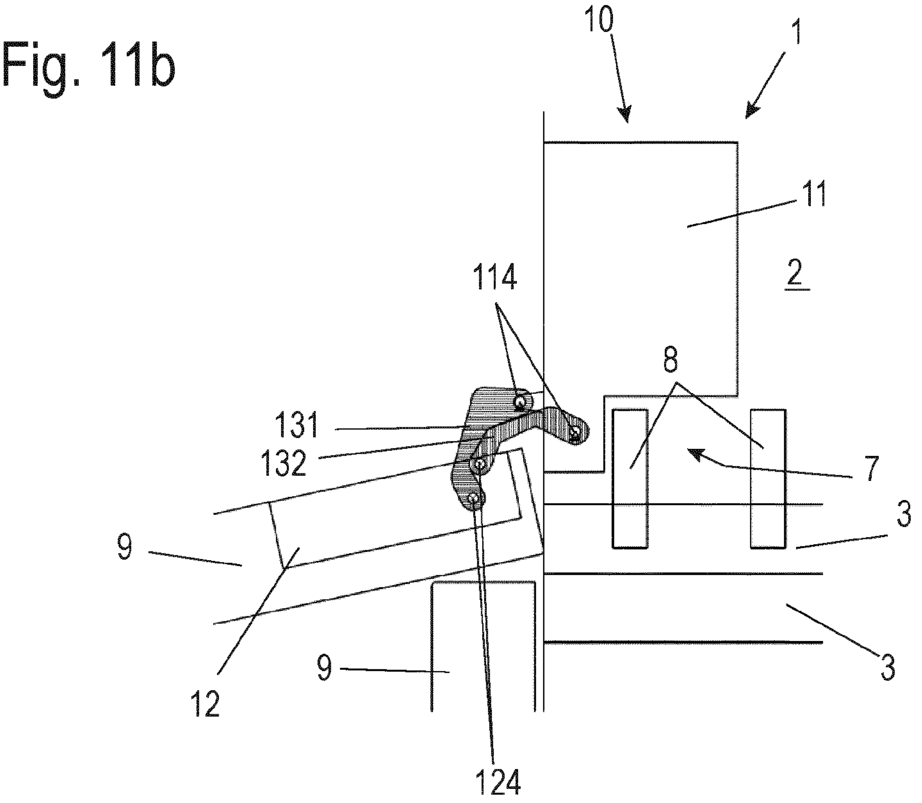
Figure 12A:
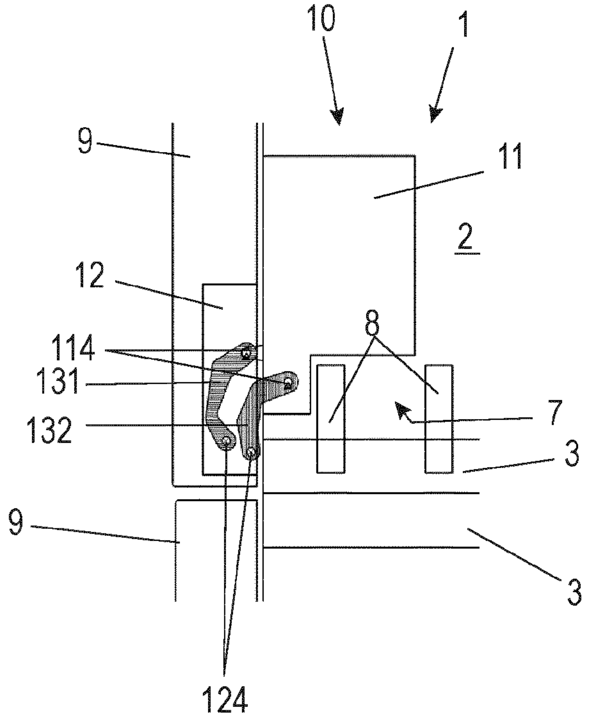
Figure 12B:
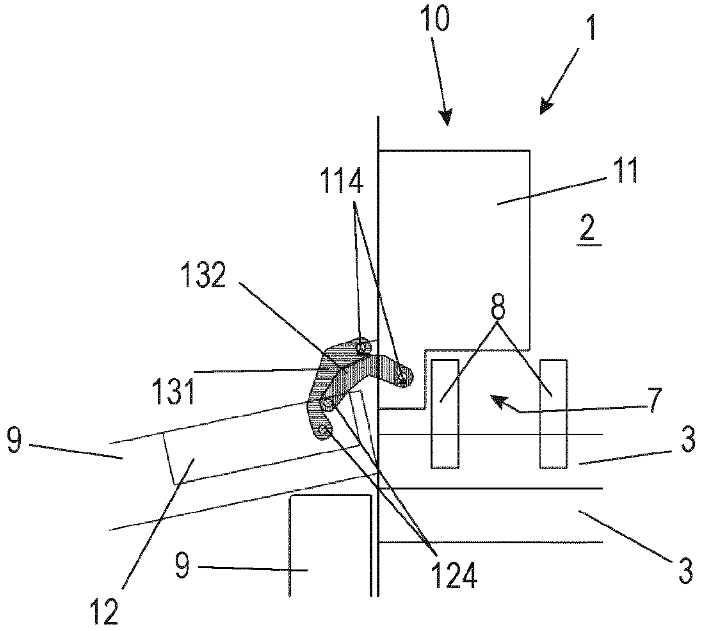
Figure 13A:
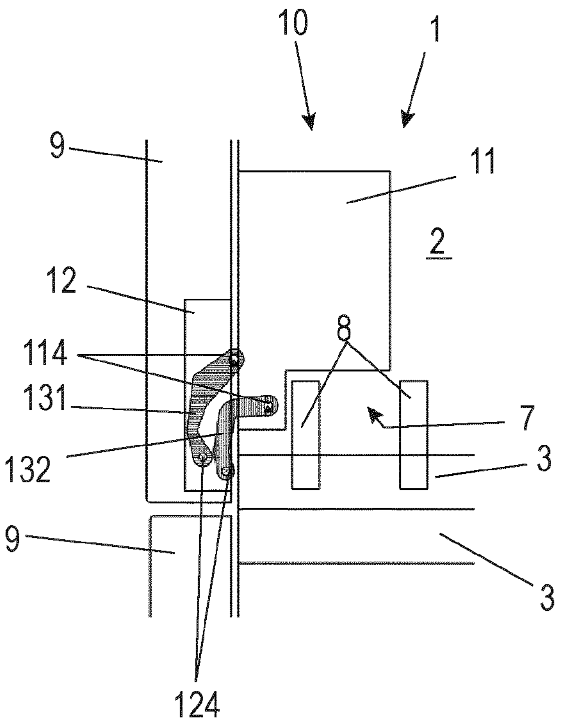
Figure 13B:
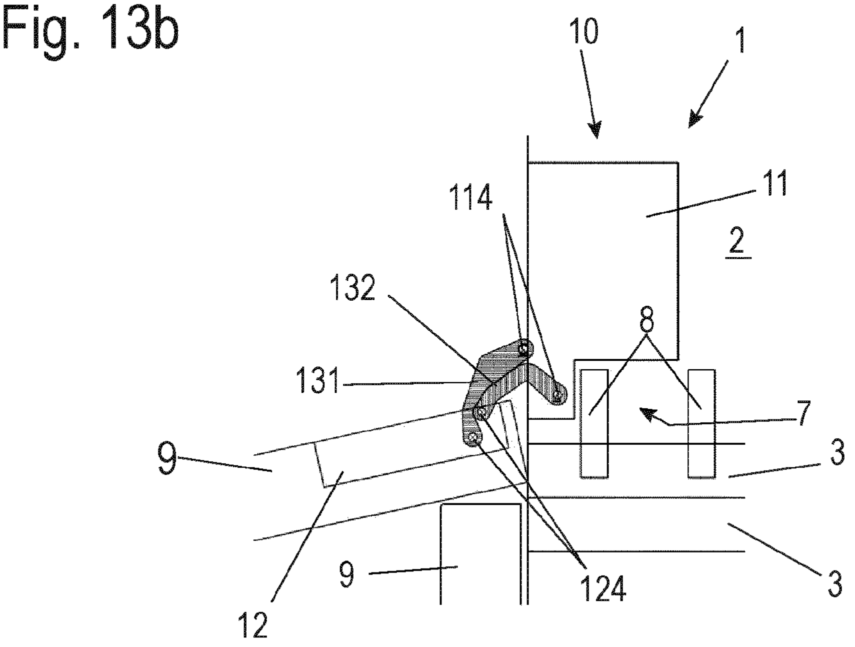
Figure 14A:
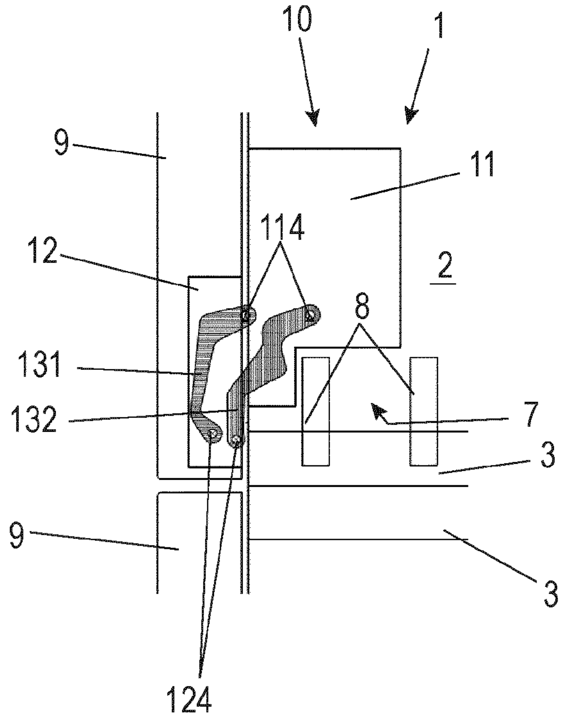
Figure 14B:
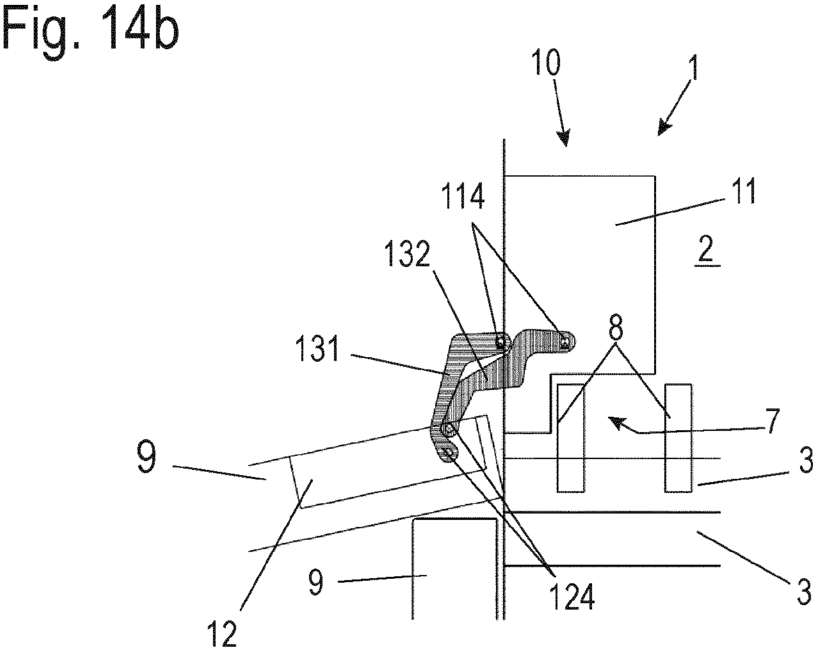
Figure 15A:
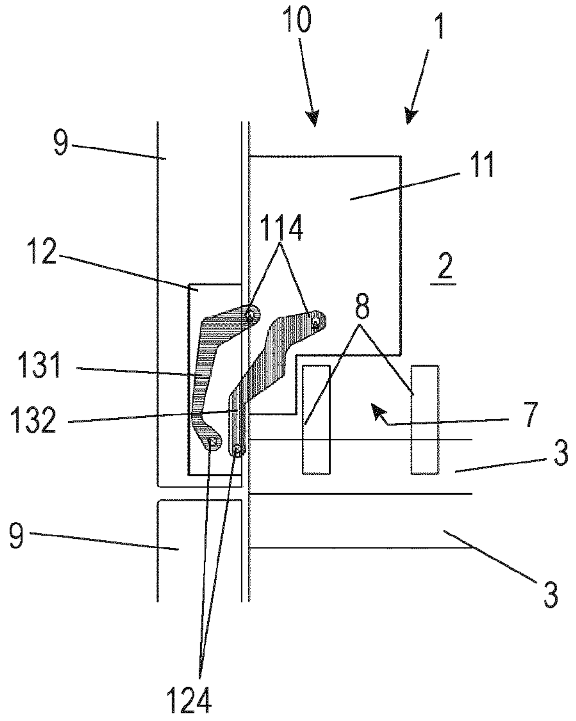
Figure 15B:
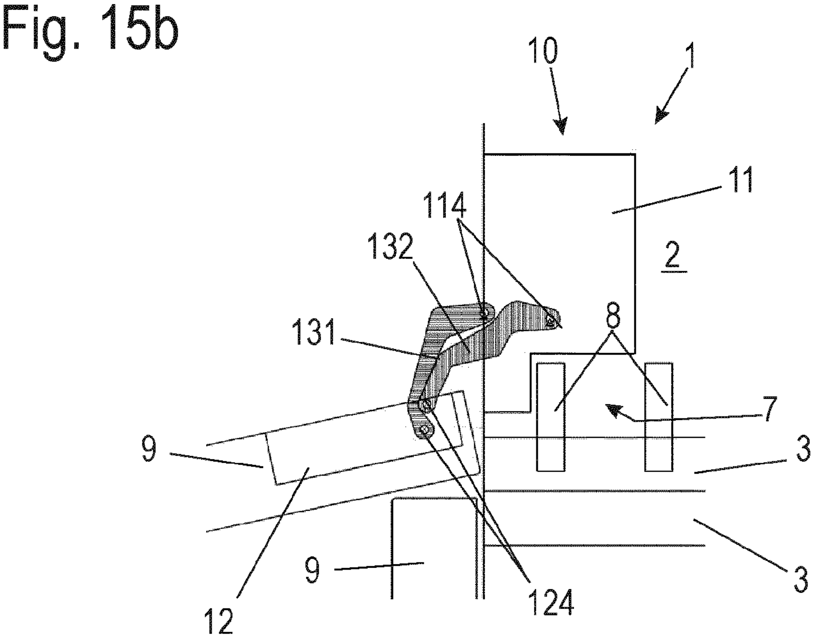
Figure 16A:
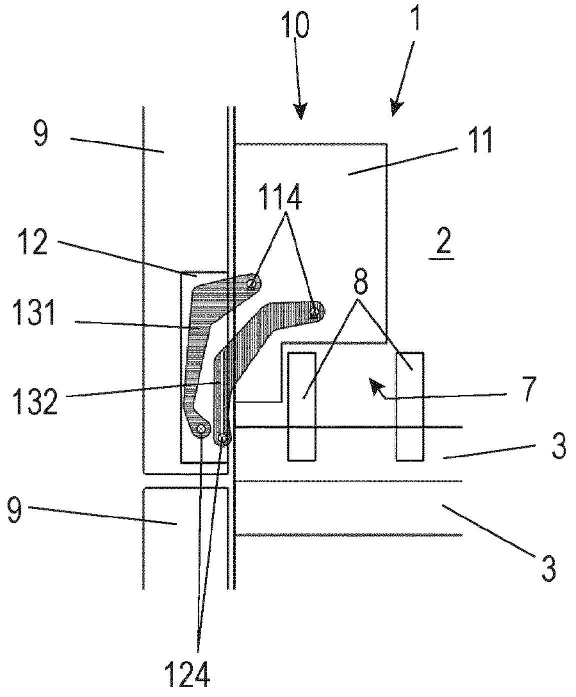
Figure 16B:
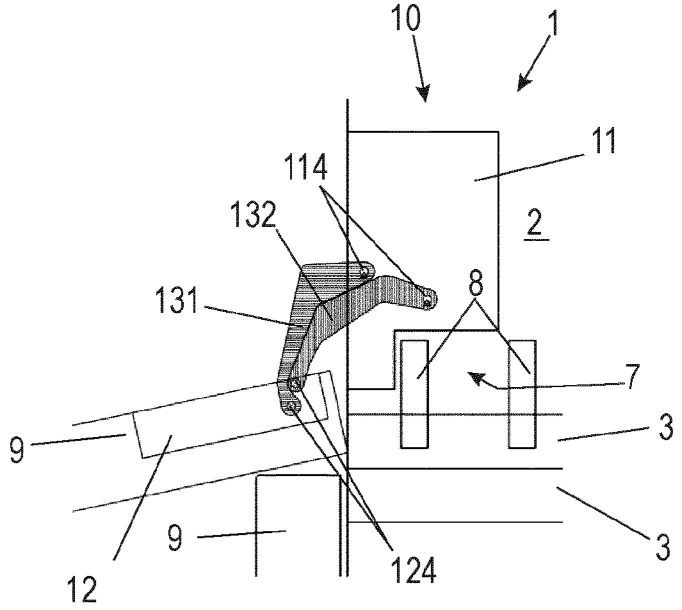

FIGS. 10*b* and 10*c* show the hinge in two different partially open positions.

In the position of FIG. 10*b*, the transition is presently taking place between a self-closing or closing damping and a self-opening or opening damping. In this state, the compression spring 15 is maximally tensioned and the damper 14 is completely extended. In this position, both rollers 1481, 1482 are in contact with the respective control curve 1461, 1462.

In the position of FIG. 10*c*, a transition then takes place on the exclusive contact of the roller 1481 with the inner control curve 1461 to the opening damping. In the maximally open position according to FIG. 10*d*, the damper 14 is then nearly completely retracted and the compression spring is slightly relaxed. The difference in the spring tension in the closed position according to FIG. 10*a* and the open position in FIG. 10*b* causes self-opening with less force than is the case during the self-closing.

Six different embodiments of hinges 10 are shown in FIGS. 11*a*-16*b*, which differ in the shaping of the main levers 131, 132. The figures having the suffix "a" show the hinge 10 in a closed position and the figures having the suffix "b" show the same hinge in each case in an open position.

Similar to FIGS. 8*a-c* and 9*a-c*, the hinges 10 in FIGS. 11*a*-16*b* are shown in an installed position of a furniture carcass 1 with door 9, which is arranged adjacent to a further furniture carcass, of which a side wall 3 and a door 9 are shown.

FIGS. 11*a*-13*b* show exemplary embodiments having shorter main levers 131, 132 than the exemplary embodiments in FIGS. 14*a*-16*b*. The exemplary embodiments of FIGS. 11*a*-13*b* are thus comparable to the exemplary embodiments described in greater detail above of FIGS. 6*a*-7*c* and FIGS. 10*a-d*. The exemplary embodiments of FIGS. 14*a*-16*b* are comparable to the exemplary embodiments of FIGS. 8*a*-9*c*.

In the exemplary embodiments of FIGS. 11*a*-13*b*, the pivot point 114 of the inner main lever 132 is in the region of the protruding housing section 112. In the exemplary embodiments of FIGS. 14*a*-16*b*, both pivot points 114 of the main levers 131, 132 are located outside this housing section 112, however, the inner main lever 132 extends inside this housing section 112 at least in the closed state of the hinge 10.

In all cases, the geometry and mounting of the main levers 131, 132 enable the housing 111 to be formed stepped and a broad remaining edge 7 for, for example, the illustrated dowels 8 to be left out behind the housing section 112. Moreover, the shapes of the main levers 131, 132 are adapted to one another in the exemplary embodiments so that in the open state of the hinge, they press against one another entirely or over broad regions so that the largest possible opening angle is achieved and a stop is also defined.

Only the main levers 131, 132 are shown in FIGS. 11*a*-16*b*. Possible extensions of the main levers 131, 132 or further control levers connected thereto, which are used for actuating dampers and/or compression springs, are not shown in these figures but can be present to offer the above-described damping functionality or keeping-closed or keeping-open functionality.

Instead of the 4-joint mechanisms described in the exemplary embodiments, other multi-joint lever mechanisms can also be used according to the invention, for example, 7-joint mechanisms.

The furniture door 9 can also be formed as a panel which is arranged on a frame, for example as a glass panel having an at least partially circumferential aluminum frame. In this case, the second hinge part 12 in the form of the hinge pot 121 is incorporated into the frame of the door or integrated into this frame.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 furniture carcass
2 panel
3 side wall
4 rear wall
5 recess
6 dowel hole
7 remaining edge
8 dowel
9 furniture door
10 hinge
11 first hinge
111 housing
1111 contour
1112 housing height
1113 housing width
112 housing section
113 carrier
114 pivot point (of the main lever)
115 pivot point (of the damper)
116 pivot point (of the compression spring)
117 pivot point (of the control lever)
118 fastening option
119 spring fastening
12 second hinge part
121 hinge pot (pot housing)
1211 contour
122 transverse section
123 fastening tab
124 linkage point (of the main lever)
13 lever mechanism
131 outer main lever
132 inner main lever
133 extension (of the outer main lever)
134 roller
135 extension (of the inner main lever)
136 control lever
137 linkage point (of the control lever)
137' oblong hole
138 actuating projection
139 roller or rounding
14 damper
141 cylinder
142 pivot joint (of the cylinder)
143 piston rod
144 pivot joint (of the piston rod)
145 linkage point (of the damper)
146 control curve lever
1461-1463 control curve
147 linkage point (of the control curve lever)
148 roller lever
1481, 1482 roller or rounding
149 pivot point (of the roller lever)
15 compression spring
151 linkage point (of the compression spring)
152 roller or rounding

The invention claimed is:

1. A furniture carcass, comprising:
two side walls;
at least one panel arranged between the two side walls;
at least one connecting element connecting the at least one panel to one of the two side walls; and
a hinge, which comprises
a first hinge part having a cassette-shaped housing and integrated in the at least one panel;
a second hinge part that includes a hinge pot and configured to be incorporated into a furniture door; and
a lever mechanism, wherein the first and second hinge parts are pivotably connected to one another via the lever mechanism,
wherein the cassette-shaped housing of the first hinge part is widened in a front region relative to a rear region of the cassette-shaped housing, wherein an opening for the lever mechanism is located in the front region,
wherein at least a part of the lever mechanism occupies a space in the front region in a closed position of the hinge,
wherein the at least one connecting element is arranged in an installation space of the at least one panel, which is behind the widened region of the cassette-shaped housing and in front of an end of the rear region of the cassette-shaped housing, and
wherein the at least one connecting element is arranged in the installation space relative to the cassette-shaped housing so that a common plane passes through the at least one connecting element and the cassette-shaped housing.

2. The furniture carcass of claim 1, wherein the cassette-shaped housing has a housing section protruding less deeply into the furniture panel than a remaining main section of the housing.

3. The furniture carcass of claim 2, wherein the lever mechanism comprises an outer main lever and an inner main lever, wherein the outer and inner main levers are linked rotatably on the cassette-shaped housing of the first hinge part and are linked rotatably on the hinge pot of the second hinge part.

4. The furniture carcass of claim 3, wherein the inner main lever is at least partially inside the housing section at least in a closed end position of the hinge.

5. The furniture carcass of claim 3, wherein the inner main lever is rotatably mounted inside the cassette-shaped housing.

6. The furniture carcass of claim 5, wherein the inner main lever is rotatably mounted inside the housing section.

7. The furniture carcass of claim 2, wherein the housing section has a depth of approximately 10 to 20 mm.

8. The furniture carcass of claim 1, wherein the front widened region faces in a direction of an end of the furniture door on which the hinge pot is arranged.

9. The furniture carcass of claim 8, wherein the hinge pot protrudes over the front widened region in the closed position in the direction of the end of the furniture door on which the hinge pot is arranged.

10. The furniture carcass of claim 1, wherein a front end of the cassette-shaped housing has a contour as an insert limit for installation of the cassette-shaped housing in the furniture panel.

11. The furniture carcass of claim 10, wherein a fastener for connecting the cassette-shaped housing to the furniture panel is arrangeable on the contour.

12. The furniture carcass of claim 11, wherein the contour is formed circumferentially around the front housing end of the cassette-shaped housing and overlaps a part of an end face of the furniture panel.

13. The furniture carcass of claim 1, wherein the hinge further comprises:

a damper in the first or in the second hinge part configured to damp opening or closing of the hinge.

14. The furniture carcass of claim 13, wherein the damper interacts directly or indirectly with the lever mechanism at least sometimes.

15. The furniture carcass of claim 1, wherein the cassette-shaped housing has a greater housing width than housing height in an installed position.

16. The furniture carcass of claim 1, wherein a housing height of the first hinge part is between 9 and 15 mm.

17. The furniture carcass of claim 1, wherein a housing width of the first hinge part is between 30 and 100 mm.

18. The furniture carcass of claim 1, wherein the hinge further comprises:

an elastic force accumulator arranged in the cassette-shaped housing and configured maintain the hinge in an open position or in the closed position.

19. The furniture carcass of claim 1, wherein the lever mechanism is a 4-joint or a 7-joint mechanism.

20. The furniture carcass of claim 1, wherein the at least one panel is a top panel, a bottom panel, or an intermediate panel.

* * * * *